United States Patent
Shiga

(10) Patent No.: US 9,673,749 B2
(45) Date of Patent: Jun. 6, 2017

(54) POWER EQUIPMENT AND HARMONIC SUPPRESSION METHOD IN POWER EQUIPMENT

(71) Applicant: SHIGA FUNCTIONAL WATER LABORATORY CORPORATION, Sagamihara-shi, Kanagawa (JP)

(72) Inventor: Seiki Shiga, Sagamihara (JP)

(73) Assignee: SHIGA FUNCTIONAL WATER LABORATORY CORPORATION, Kanagawa (JP)

( * ) Notice: Subject to any disclaimer, the term of this patent is extended or adjusted under 35 U.S.C. 154(b) by 0 days.

(21) Appl. No.: 15/106,620

(22) PCT Filed: Nov. 27, 2014

(86) PCT No.: PCT/JP2014/005945
§ 371 (c)(1),
(2) Date: Jun. 20, 2016

(87) PCT Pub. No.: WO2015/097986
PCT Pub. Date: Jul. 2, 2015

(65) Prior Publication Data
US 2017/0033727 A1    Feb. 2, 2017

(30) Foreign Application Priority Data
Dec. 27, 2013 (JP) .................. 2013-271651

(51) Int. Cl.
H02J 3/01 (2006.01)
H02P 29/50 (2016.01)
(52) U.S. Cl.
CPC ............... H02P 29/50 (2016.02); H02J 3/01 (2013.01)
(58) Field of Classification Search
CPC .................... H02J 3/01; H02P 29/50
See application file for complete search history.

(56) References Cited

U.S. PATENT DOCUMENTS

| 5,189,357 A | * | 2/1993 | Woodson | ................. H02K 3/28 318/737 |
| 2005/0073280 A1 | * | 4/2005 | Yoshinaga | ................ H02J 3/01 318/727 |
| 2005/0218863 A1 | * | 10/2005 | Edelson | ................... H02K 3/28 318/727 |

FOREIGN PATENT DOCUMENTS

| JP | 10-80150 | 3/1998 |
| JP | 11-69627 | 3/1999 |

(Continued)

OTHER PUBLICATIONS

International Search Report for PCT/JP2014/005945, mailed Jan. 13, 2015, 4 pages.

*Primary Examiner* — Shawki S Ismail
*Assistant Examiner* — Muhammad S Islam
(74) *Attorney, Agent, or Firm* — Nixon & Vanderhye, P.C.

(57) ABSTRACT

Provided is a power equipment which obtains a power saving effect according to the operation of an electric motor by providing a harmonic suppression function on the side of a power trunk line for supplying power to the electric motor without changing the electric motor side. The power equipment includes an electric motor (14) which is supplied with power from a power trunk line (12) connected to a power source transformer (11) to be operated. A harmonic generation unit (13) is provided in the power trunk line (12) and generates a harmonic voltage having a phase opposed to but the same degree as that of a harmonic voltage of a degree acting as a braking force on a rotor (14-2) in a rotational magnetic flux of harmonics generated between a stator (14-1) and the rotor when the electric motor (14) is operated.

11 Claims, 19 Drawing Sheets

(56) References Cited

FOREIGN PATENT DOCUMENTS

| JP | 2006-185243 | 7/2006 |
|---|---|---|
| JP | 2008-236923 | 10/2008 |
| JP | 2008-295203 | 12/2008 |

* cited by examiner

_US 9,673,749 B2_

POWER EQUIPMENT AND HARMONIC SUPPRESSION METHOD IN POWER EQUIPMENT

This application is the U.S. national phase of International Application No. PCT/JP2014/005945 filed 27 Nov. 2014, which designated the U.S. and claims priority to JP Patent Application No. 2013-271651 filed 27 Dec. 2013, the entire contents of each of which are hereby incorporated by reference.

TECHNICAL FIELD

Embodiments of the present invention relate to a power equipment and a harmonic suppression method in the power equipment which includes an electric motor supplied with power from a power trunk line connected to a power source transformer.

BACKGROUND ART

In general, an induction motor is widely used as a power source of various types of equipment. In such type of electric motor, a power source voltage is supplied from a power trunk line to a primary winding provided in a stator to generate a rotation magnetic field. The rotation magnetic field causes a rotation torque in a rotor to rotate. In this case, harmonic voltages are generated due to the structure of the stator and the rotor. The harmonic voltages lower an operational efficiency of the electric motor, and lead to an increase in temperature.

Therefore, various proposals for lowering the harmonics have been made. For example, an element for suppressing a harmonic magnetic flux is provided in a part of a magnetic body where a main magnetic circuit of the electric motor is formed (for example, see Patent Literature 1).

CITATION LIST

Patent Literature

Patent Literature 1: Japanese Patent Application Laid-Open No. 2008-295203

SUMMARY OF INVENTION

Technical Problem

An object to be solved by the invention is to provide a power equipment and a harmonic suppression method in the power equipment which obtains a power saving effect according to the operation of an electric motor by providing a harmonic suppression function on the side of a power trunk line for supplying power to the electric motor without changing the electric motor side.

Solution to Problem

A power equipment according to an embodiment of the invention is a power equipment which includes an electric motor which is supplied with power from a power trunk line connected to a power source transformer, including: a harmonic generation unit which is provided in the power trunk line and generates a harmonic voltage having a phase opposed to but the same degree as that of a harmonic voltage of a degree acting as a braking force on a rotor among harmonic voltages generated by a rotational magnetic flux of harmonics generated between the stator and the rotor based on the number of slots which contain a coil of a stator when the electric motor is operated.

According to the above configuration, a harmonic voltage for generating a rotational magnetic flux counteracting a rotational magnetic flux acting as a braking force, when the electric motor is operated, is added to the configuration, so that the harmonic is suppressed, the operation efficiency of the electric motor is improved, and a power saving effect can be obtained.

DESCRIPTION OF EMBODIMENTS

Hereinafter, embodiments of the invention will be described in detail with reference to the drawings.

Figure 1:
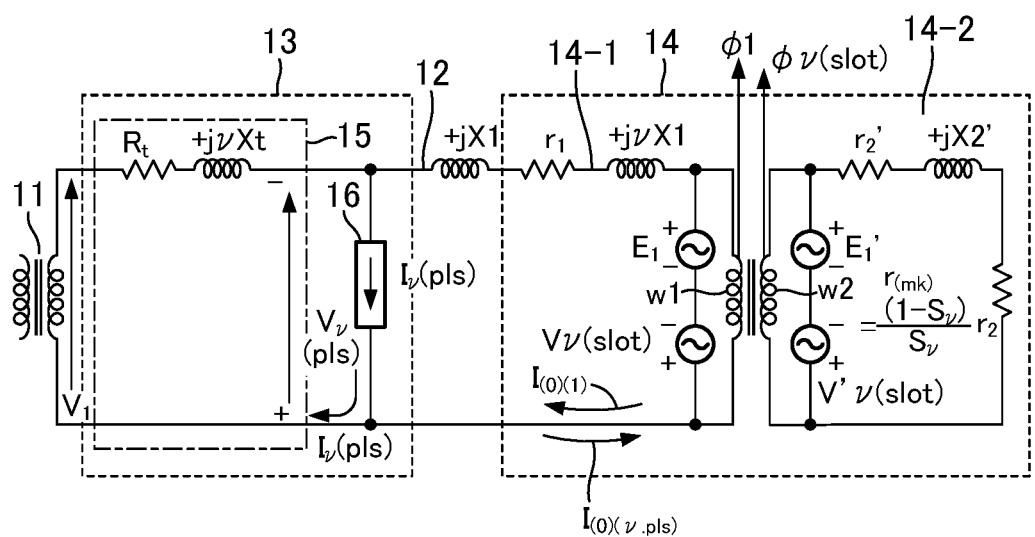
FIG. 1 is an equivalent circuit diagram illustrating a power equipment according to an embodiment of the invention.

FIG. 1 illustrates an equivalent circuit representing a relation between a power source transformer 11, a power trunk line 12, a harmonic generation unit 13, and an induction motor 14, all of which are included in a power equipment. The harmonic generation unit 13 includes a reactance circuit 15 and a harmonic current generator 16. As illustrated in the drawing, the harmonic current generator 16 may be provided in the vicinity of the power source transformer 11, or may be provided in the vicinity of an input terminal of the induction motor 14 connected to a terminal of the power trunk line (also referred to as a low-voltage trunk line) 12.

The power trunk line (100V, 200V, 400V, and so on) 12 is derived from both ends of the secondary winding of the power source transformer 11. A power source voltage V1 is generated between both ends of the secondary winding of the power source transformer 11. In addition, there are a wire wound resistance Rt of the power source transformer 11 and a leakage reactance +jvXt of the winding on a side of the secondary winding, which form the above-described reactance circuit 15.

In addition, the harmonic current generator 16 as a source of a harmonic current (a continuous current or a pulse current) Iv(pls) containing a v-th (11th, 17th, 23rd, and so on) harmonic is connected between the power trunk lines 12. The harmonic current Iv(pls) flows toward a power source transformer 11 having a low impedance.

Figure 2:
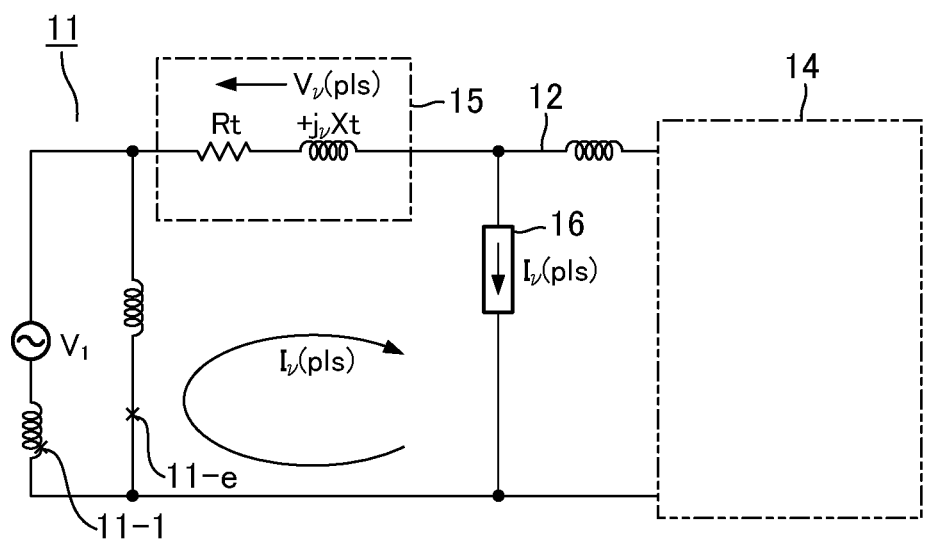
FIG. 2 is an equivalent circuit diagram in which a part of the equivalent circuit illustrated in FIG. 1 is redrawn.

Herein, the equivalent circuits of the transformer 11 and the reactance circuit 15 can be redrawn as illustrated in FIG. 2. In FIG. 2, since a primary leakage reactance 11-1 of the transformer 11 is remarkably smaller than a reactance 11-$e$ of an excitation circuit of the transformer 11, the primary leakage reactance 11-1 is regarded as a short circuit. The impedance of the reactance circuit 15 is set to Zv(pall). In the reactance circuit 15, the harmonic current Iv(pls) from the harmonic current generator 16 flows in a direction depicted in the drawing, and thus a harmonic power source voltage Vv(pls) is generated. In other words, since the harmonic current generator 16 is a current source to make the v-th harmonic current Iv(pls) flow to generate the harmonic power source voltage Vv(pls).

Returning to FIG. 1, an electric motor 14 connected to the power trunk line 12 includes a stator 14-1 and a rotor 14-2. A primary winding w1 is provided in the stator 14-1 of the electric motor, and a secondary winding w2 is provided in the rotor 14-2. The primary winding w1 is connected to the power trunk line 12 through a line reactance $+jXl$, and includes a resistance r1 and a reactance $+jvx1$. In addition, the secondary winding w2 includes a resistance r2', a reactance $+jx2'$, and a resistance $r(mk)=(1-Sv)r2'/Sv$ which corresponds to a mechanical load.

Herein, when the power source voltage V1 of a substantially basic wave is applied from the power trunk line 12 to an input terminal (not illustrated) of the electric motor 14, an excitation current I(0)(1) of the basic wave delayed by 90° with respect to the power source voltage V1 of the basic wave flows in the primary winding w1 provided in the stator 14-1 of the electric motor 14 as illustrated in FIG. 1. In addition, a rotational magnetic flux $\phi1$ having the same phase as that of the excitation current I(0)(1) is generated between the stator 14-1 and the rotor 14-2 in proportion to the excitation current I(0)(1). Then, a counter electromotive force E1 delayed by 90° with respect to the rotational magnetic flux $\phi1$ (delayed by 180° with respect to the power source voltage V1) is generated. In addition, a voltage E1' is induced in the secondary winding w2 of the rotor 14-2 in proportion to the voltage E1.

Figure 3:
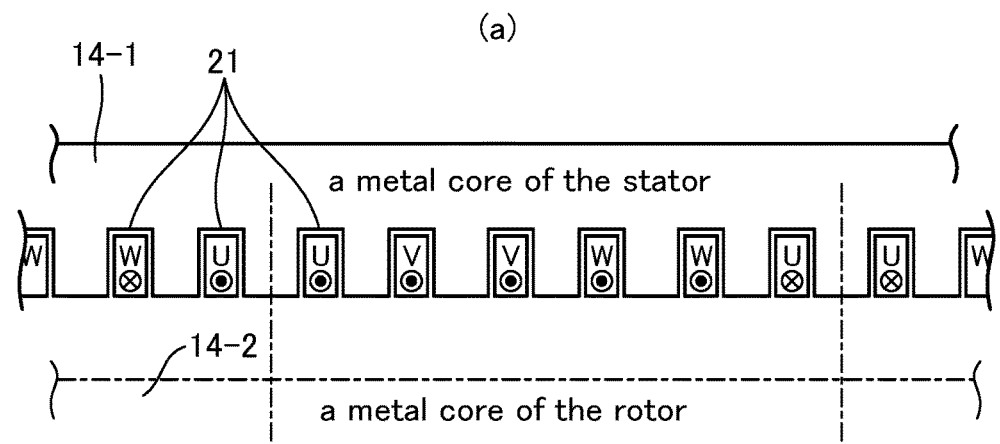
FIG. 3 is a diagram illustrating a relation between a stator and a rotor of an electric motor used in the power equipment according to the embodiment of the invention, in which (a) illustrates the structure thereof and (b) illustrates a magnetic flux generated therebetween.

A slot is formed in the stator 14-1 of the electric motor to contain the primary winding w1, and a magnetic resistance is regularly distributed due to the slot. In other words, as illustrated in FIG. 3($a$), a slot 21 is formed in the stator 14-1 to contain the primary winding (also referred to as a coil) w1 of three phases (u, v, and w) as described above. In a gap between the stator 14-1 and the rotor 14-2, there is a difference in magnetic resistance (permeance) immediately below the slot 21 containing the coil and immediately below a metal core of the stator. Therefore, besides the rotational magnetic flux $\phi1$ caused by the basic wave, there is generated a rotational magnetic flux $\phi v$ of a v-th harmonic which is caused by the slot 21 and corresponds to the number of slots.

Herein, a distribution wave K of the permeance caused by the slot 21 is expressed as the following Equation (1) (where, Z1 indicates a total number of slots of the stator 14-1, τp indicates a distance between electrodes on an armature, and P indicates the number of electrode pairs).

[Expression 1]

$$K = K_{av} + K_s \sin\frac{\pi}{\tau_P}\left(\frac{Z_1}{P}\right)X \quad (1)$$

Further, in Equation (1), kav indicates an average of the permeance.

In a rotational magnetic flux density of the basic wave illustrated in FIG. 3(*b*), when B1 is set to B1 sin(π/τ·x), a magnetic flux density wave Bv in an actual rotating state is expressed as the following Equation (2).

[Expression 2]

$$\begin{aligned}Bv &= B_1 \sin\left(\frac{\pi}{\tau_P}X\right) * \left[K_{av} + K_s \sin\frac{\pi}{\tau_P}\left(\frac{Z_1}{P}\right)X\right] \\ &= B_1 K_{sv}\sin\left(\frac{\pi}{\tau_P}X\right) + \frac{B_1 K_3}{2}\left\{(-)\cos\left(1+\frac{Z_1}{P}\right)\frac{\pi}{\tau_P}X +\right. \\ &\quad \left.\cos\left(\frac{Z_1}{P}-1\right)\frac{\pi}{\tau_P}X\right\}\end{aligned} \quad (2)$$

From the above Equation (2), it can be seen that a rotational magnetic flux B(Z1/P+1) of a (Z1/P+1)-th harmonic delayed by 90° with respect to a basic waveform B1, and a rotational magnetic flux B(Z1/P−1) of a (Z1/P−1)-th harmonic advanced by 90° with respect to the basic waveform B1 are generated. Since the magnetic flux is proportional to the area of a magnetic circuit (that is, ϕ1∝B1), it means that the ϕ(Z1/P−1)-th rotational magnetic flux and the ϕ(Z1/P+1)-th rotational magnetic flux are generated.

As is well known, the ϕ(Z1/P+1)-th magnetic flux rotates while being delayed by 90° in the forward direction with respect to the rotational magnetic flux ϕ1 of the basic wave. In addition, the ϕ(Z1/P−1)-th magnetic flux rotates while being advanced by 90° in a backward direction with respect to the rotational magnetic flux ϕ1 of the basic wave. In general, 12, 18, or 24 slots (Z1/P) per pole of the electric motor are widely used. Therefore, the 11th, 17th, or 23rd magnetic flux density wave of the backward rotation is generated as the ϕ(Z1/P−1)-th magnetic flux, and 13th, 19th, or 25th magnetic flux density wave of the forward rotation is generated as the ϕ(Z1/P+1)-th magnetic flux.

With the rotational magnetic flux ϕv(slot) of the harmonic of which the degree v is (Z1/P+1) and (Z1/P−1), a harmonic voltage Vv(slot) is generated in the primary winding w1 of the stator 14-1, and a harmonic voltage Vv'(slot) is generated in the secondary winding w2 of the rotor 14-2. Among them, the (Z1/P−1)-th (11th, 17th, or 23rd) harmonic voltage Vv'(slot) generates a rotational magnetic flux acting as a braking force on the rotor 14-2, and wastes power as described below. Therefore, there is a need to lower the corresponding harmonic voltage. Hereinafter, the description will be made about a countermeasure against the (Z1/P−1)-th harmonics.

In the invention, as illustrated in FIGS. 1 and 2, the harmonic current generator 16 is connected to the power trunk line, and the constant v-th harmonic current Iv(pls) flows to the reactance circuit 15 having the impedance Zv(pall). Therefore, a harmonic voltage Vv(pls)=Zv(pall)·Iv(pls) is generated and amplified. The rotational magnetic flux ϕv(pls) of the harmonic having the opposite phase to the rotational magnetic flux ϕv(slot) of the v-th harmonic caused by the slot 21 described above is generated by the harmonic voltage Vv(pls). With this configuration, the rotational magnetic flux ϕv(slot) of the harmonic is reduced, and the harmonic voltages Vv(slot) and Vv'(slot) generated by the rotational magnetic flux ϕv(slot) of the harmonic are reduced. As a result, it is possible to reduce the power which is wastefully used by the harmonic voltage Vv'(slot).

Hereinafter, the above-described relation will be described using a vector diagram and FIG. 4.

Figure 4:
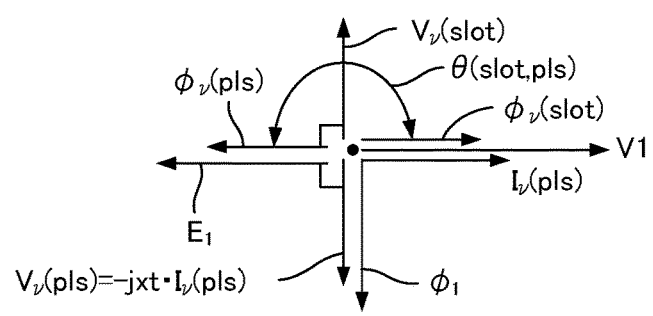
FIG. 4 is a vector diagram for illustrating an operation of the embodiment of the invention.

FIG. 4 illustrates the 17th harmonic in a case where "m" is a constant of 3, the number "q" of coils per pole/phase is 3, and the number of slots per-pole pair is 2 mq (that is, 18 (=Z1/P) electric motors described above).

When the power source voltage V1 is applied to the input terminal of the electric motor 14, the rotational magnetic flux ϕ1 delayed by 90° with respect to the power source voltage V1 of the basic wave is generated between the stator 14-1 and the rotor 14-2, and the counter electromotive force E1 delayed by 90° with respect to the rotational magnetic flux ϕ1 (delayed by 180° with respect to the power source voltage V1) is generated in the primary winding w1 of the stator 14-1.

In the gap between the stator 14-1 and the rotor 14-2, the rotational magnetic flux ϕv(slot) of the v-th harmonic corresponding to the number of slots 21 containing the coil is generated. The rotational magnetic flux ϕv(slot) of the harmonic is advanced by 90° with respect to the rotational magnetic flux ϕ1 of the basic wave. In addition, the harmonic voltage Vv(slot) is generated in the primary winding w1 by the rotational magnetic flux ϕv(slot) of the harmonic. The harmonic voltage Vv(slot) is advanced by 90° with respect to the rotational magnetic flux ϕv(slot) of the harmonic.

With this regard, the v-th harmonic current Iv(pls) of the same phase as that of the power source voltage V1 flows from the harmonic current generator 16 illustrated in FIGS. 1 and 2 to the reactance circuit 15 containing the leakage reactance +jvXt of the power source transformer 11 in the direction depicted in the drawing. Since the harmonic current Iv(pls) flows to the reactance circuit 15 described above, the harmonic current causes a voltage drop between both ends of the reactance circuit 15 due to the impedance Zv(pall). When the harmonic voltage is set to Vv(pls), Vv(pls)=−Zv(pall)·Iv(pls) is obtained. Since the impedance Zv(pall) of the reactance circuit 15 contains the leakage reactance +jvXt of the power source transformer 11 as described above, the harmonic voltage Vv(pls) generated by the flowing current I17(*pls*) comes to have a phase delayed by 90° with respect to the power source voltage V1 as illustrated in FIG. 4.

Herein, in a case where the harmonic current generator 16 is connected to the terminal of the low-voltage trunk line, the reactance of the reactance circuit 15 becomes a total value of a reactance Xt of the power source transformer 11 and a reactance X1 of the low-voltage trunk line 12, and the impedance Zv(pall) is obtained.

When the harmonic voltage Vv(pls) is applied to the primary winding w1 of the electric motor 14, a v-th excitation current I(0)(v,pls) flows to the primary winding w1 as illustrated in FIG. 1. Since the excitation current I(0)(v,pls) is delayed by 90° with respect to the harmonic voltage Vv(pls), the rotational magnetic flux ϕv(pls) of the harmonic having the same phase as that of the excitation current I(0)(v,pls) is generated as illustrated in FIG. 4. In other words, the rotational magnetic flux φv(pls) of the harmonic based on the harmonic current generator 16 has a phase angle θv(slot, pls) of 180° with respect to the rotational magnetic flux φv(slot) of the harmonic caused by the slot, and thus becomes the complete opposite phase. Therefore, the rotational magnetic flux φv(slot) of the harmonic caused by the slot is reduced, and the harmonic voltage Vv(slot) generated by the rotational magnetic flux φv(slot) of the harmonic and the harmonic voltage V'v(slot) induced in the secondary winding w2 by the harmonic voltage are reduced. As a result, it is possible to reduce the power which is wastefully used by the harmonic voltage Vv'(slot).

Herein, not only the electric motor 14, which is supplied with power from the power trunk line 12, having 18 slots (that is, Z1/P is 18) per-pole pair described above, but also the electric motors having 12 or 24 (Z1/P) slots are mixedly used in the same power trunk line 12 in many cases. In other words, as described above, there is widely used the electric motor 14 of which the number of slots (Z1/P) per pole is 12, 18, or 24. Therefore, a generator supplying the harmonic current in which the 11th, 17th, and 23rd harmonics are mixed is used as the harmonic current generator 16 connected to the power trunk line 12 so as to generate a backward rotation torque in the electric motor 14.

Figure 5:
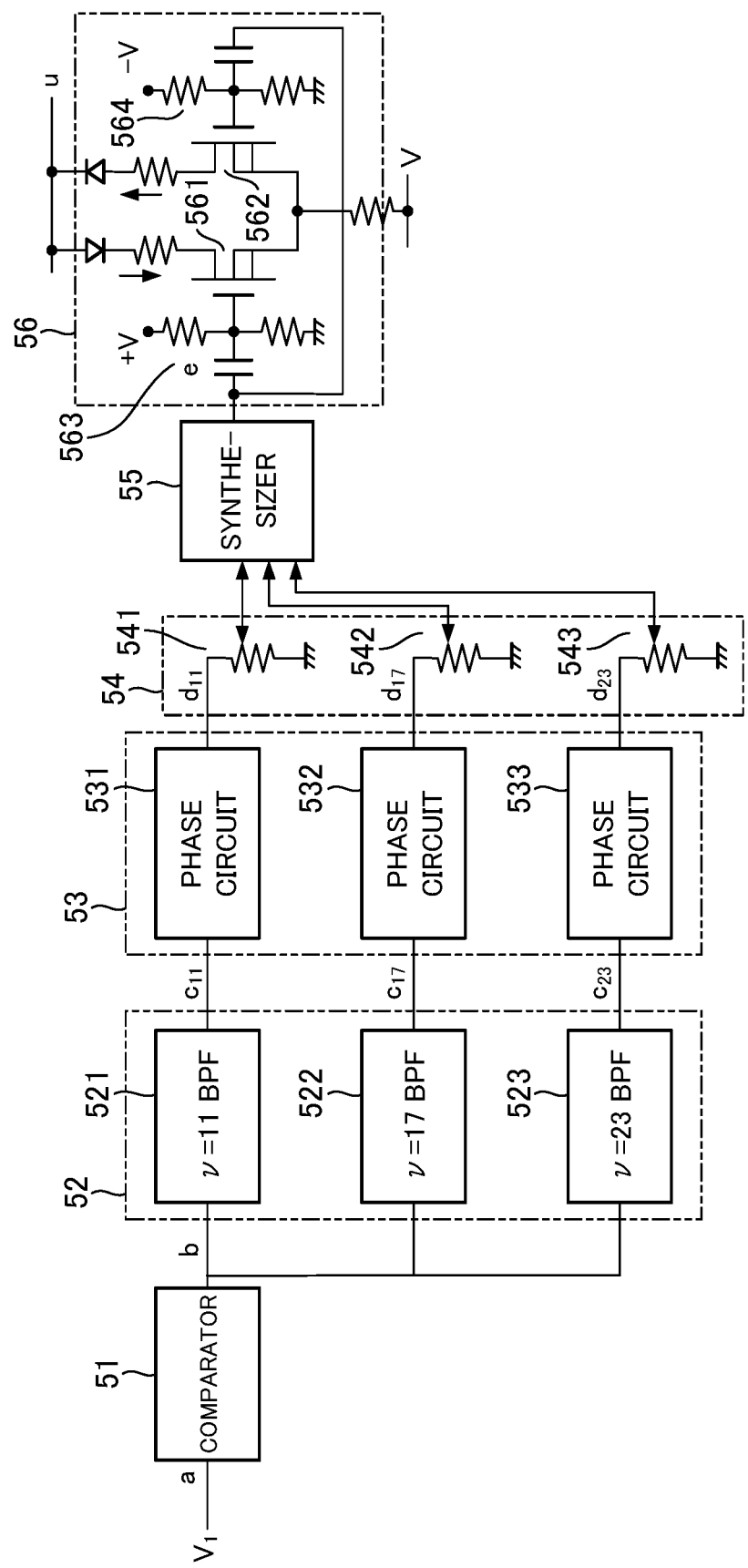
FIG. 5 is a circuit diagram illustrating an example of a harmonic current generation circuit used in an embodiment of the invention.

The harmonic current Iv(pls) supplied by the harmonic current generator 16 is assumed as a continuous current or a pulse current. First, the description will be made about the harmonic current generator 16 which generates the continuous current in which the 11th, 17th, and 23rd current waveforms of the harmonic current Iv(pls) with respect to the power source voltage V1 of the basic wave are contained will be described using FIG. 5. Further, FIG. 5 illustrates a configuration corresponding to one phase component. Since the actual power trunk line 12 is configured as a three-phase system, three one-phase circuits illustrated in FIG. 5 are provided in correspondence with the input voltages of the respective phases u, v, and w of the three-phase system.

As illustrated in FIG. 5, the harmonic current generator 16 is configured by a comparator 51, a band pass filter (hereinafter, referred to as BPF) 52, a phase circuit 53, a variable resistor 54, a synthesizer 55, and an output circuit 56.

The input voltage from the respective phases (for example, the u phase), that is, the power source voltage V1 of the basic wave, is input to the input side of the comparator 51. A rectangular wave having the same phase as that of the power source voltage V1 of the basic wave is obtained and output by the comparator 51. BPFs 521, 522, and 523 for the 11th, 17th, and 23rd harmonics are connected to the output side of the comparator 51. These BPFs 521, 522, and 523 obtain the 11th, 17th, and 23rd harmonic voltages from the above-described rectangular wave voltage.

The phase circuits 531, 532, and 533 are connected to the output side of the BPFs 521, 522, and 523, through which the phases of the 11th, 17th, and 23rd harmonic voltages are adjusted to be synchronized with the phase of the power source voltage V1 of the basic wave. Furthermore, after the content rate of the voltage components is adjusted using variable resistors 541, 542, and 543, the harmonic voltages are input to the synthesizer 55.

The output circuit 56, which configures one phase component of the trunk line 12 and is provided between the lines u and v, is connected to the output side of the synthesizer 55. The output circuit 56 includes power transistors or MOS FETs (the drawing illustrates the MOS FETs) 561 and 562 as final-stage output elements connected in reverse parallel between the lines u and v through diodes and resistors. Then, the bases or gates of these output elements are connected to the output side of the above-described synthesizer 55 through bias circuits 563 and 564. In this way, the bias circuits 563 and 564 are respectively provided in the bases or gates of the power transistors or MOS FETs 561 and 562 so as to function as an analog amplifier.

Since the harmonic current generator 16 is configured as described above, the harmonic current Iv(pls) containing the 11th, 17th, and 23rd harmonics having the same phase as that of the power source voltage V1 of the basic wave flows between the trunk lines 12 (the lines u and v in FIG. 5).

Figure 6:
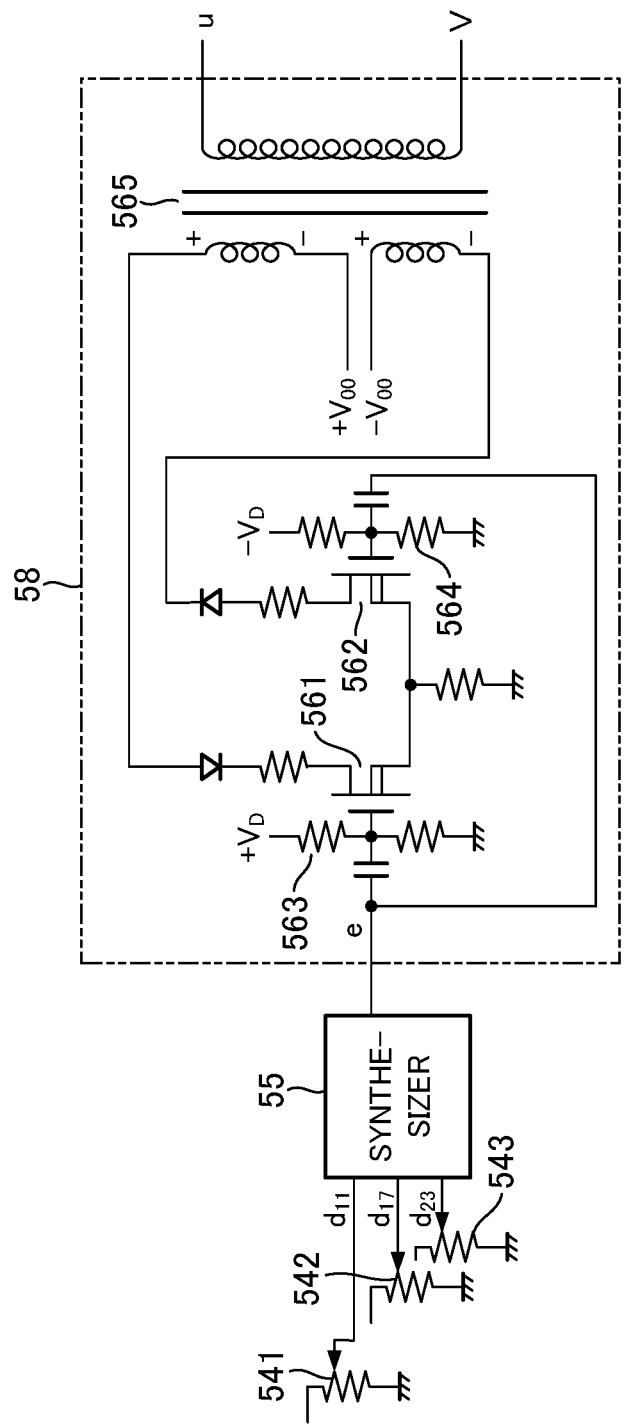
FIG. 6 is a circuit diagram illustrating a harmonic current generation circuit improved on a part of that of FIG. 5.

Further, the circuit of the harmonic current generator 16 may be configured as illustrated in FIG. 6. In other words, a transformer 565 is added to the circuit illustrated in FIG. 5, and direct-current power supplies +VOO and −VOO are connected to the respective final-stage output elements 561 and 562 through the transformer 565. With such a configuration, even when the power source voltage V1 of the basic wave is in the negative half cycle, the direct-current power source voltage is applied, so that the harmonic current can flow.

Figure 8:
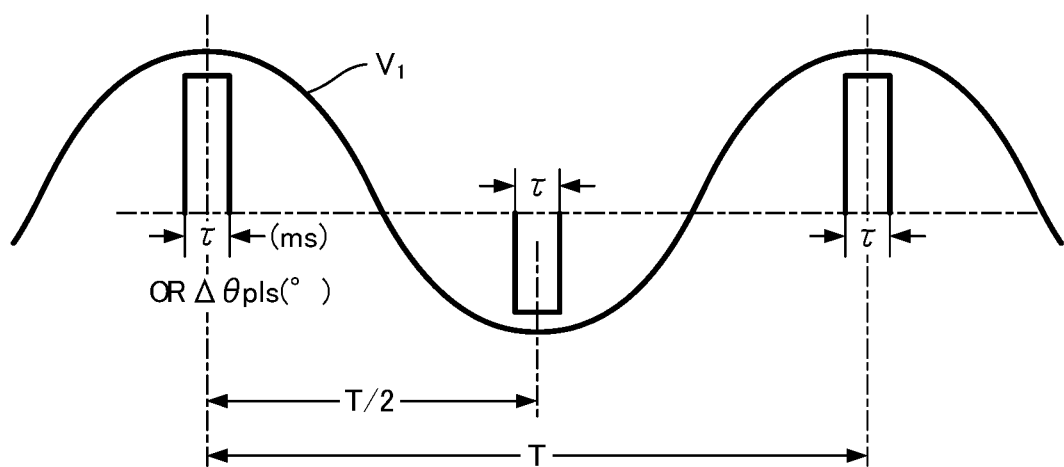
FIG. 8 is a waveform diagram illustrating a phase relation between a pulse wave output from the apparatus of FIG. 7 and a power source voltage.

Next, the description will be made about a case where the harmonic current Iv(pls) supplied by the harmonic current generator 16 is a rectangular pulse waveform. In this case, as illustrated in FIG. 8, a rectangular pulse which is symmetric with respect to a peak phase of the power source voltage V1 of the basic wave and has a width of τ is configured to flow. At this time, the contained harmonic current component Iv(pls) has the same phase as that of the power source voltage V1 of the basic wave. In the case of such a pulse current, a pulse duty (τ/T) is set to be 1/23 or less, or preferably 1/30 or less in order to contain the 23rd component at a maximum. Further, T indicates a period of the basic wave.

Figure 7:
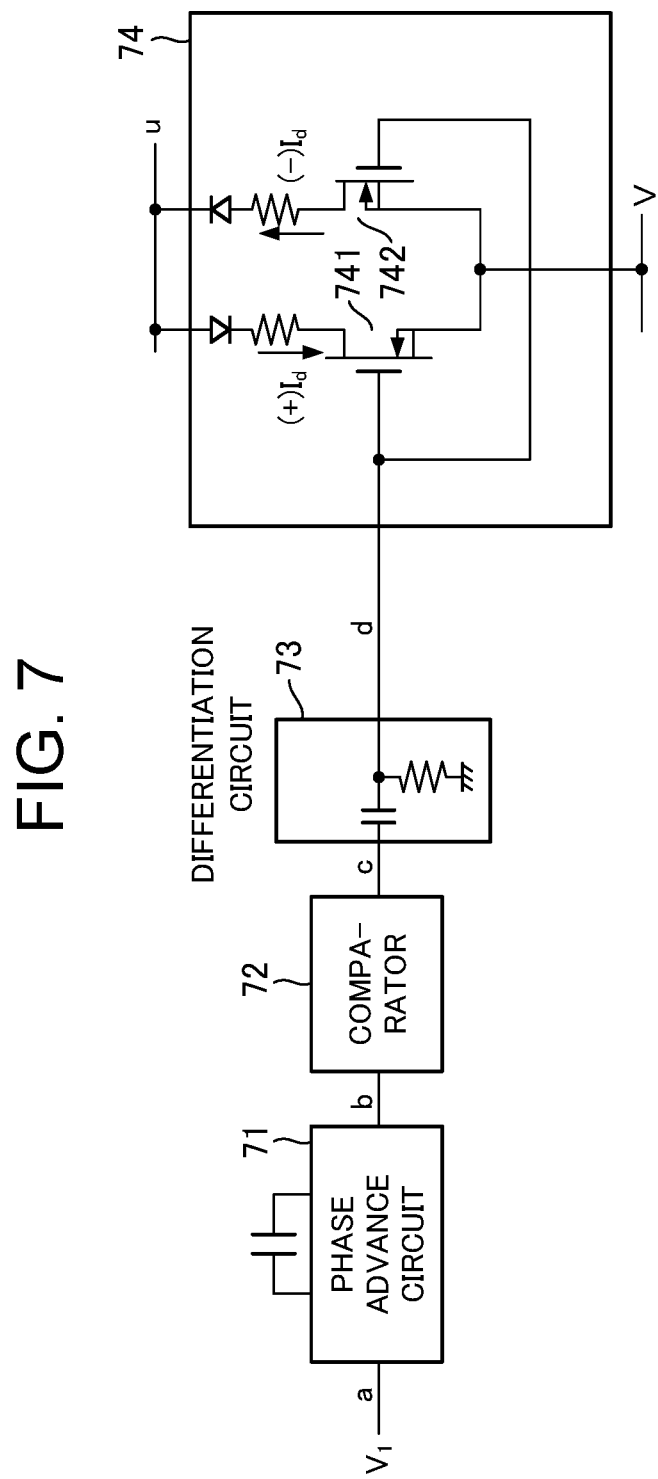
FIG. 7 is a circuit diagram illustrating another example of the harmonic current generation circuit used in an embodiment of the invention.

The harmonic current generator 16 in this case is configured by a phase advance circuit 71, a comparator 72, a differentiation circuit 73, and an output circuit 74 as illustrated in FIG. 7.

Figure 9:
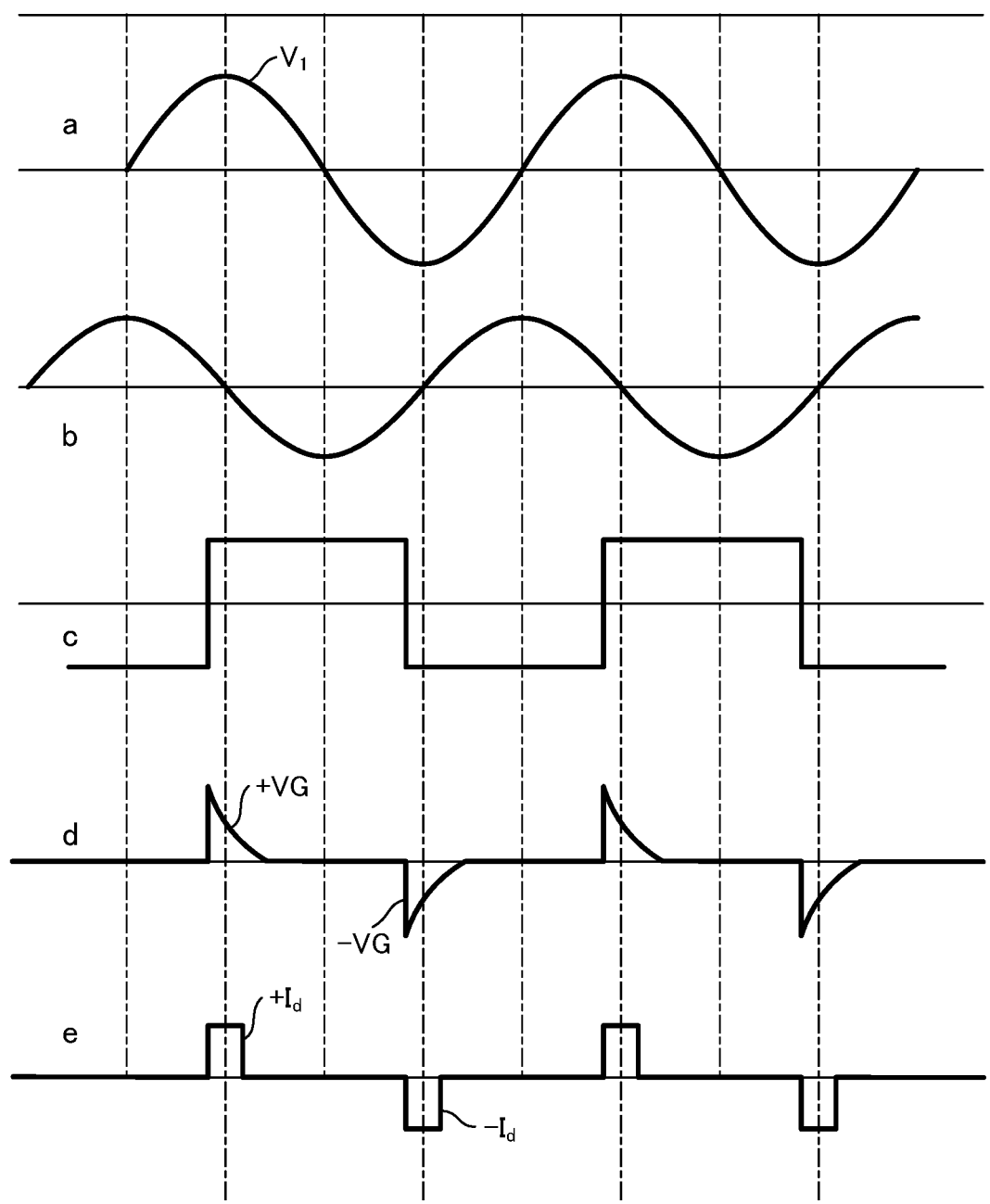
FIG. 9 is a waveform diagram alternately illustrating waveforms at respective points of the apparatus of FIG. 7.

The phase advance circuit 71 is, while not illustrated, configured by an integration circuit which uses an operational amplifier, and includes a parallel capacitor and a variable resistor for adjusting the phase. The input voltage from the respective phases (for example, the u phase), that is, the power source voltage V1 of the basic wave, is input to an input point "a" of the phase advance circuit 71 (the waveform "a" of FIG. 9). A sinusoidal wave (the waveform "b" of FIG. 9) of which the phase is advanced by 90°−τ/2 with respect to the power source voltage V1 of the basic wave is output at an output point "b" of the phase advance circuit 71 by adjusting the above-described resistor.

This sinusoidal wave is input to the comparator 72, and formed into a rectangular wave. Therefore, a rectangular wave (the waveform "c" of FIG. 9) of which the phase rises or falls at points advanced by 90°−τ/2 with respect to the origin point of the power source voltage V1 of the basic wave is obtained at an output terminal "c".

This rectangular wave is input to and differentiated by the differentiation circuit. The differentiation circuit 73 is configured by a capacitor and a variable resistor for adjusting a time constant as is well known. When the above-described rectangular wave is input, exponential waves +Vg and −Vg (the waveform "d" of FIG. 9) of the differentiation outputs are obtained at an output point "d".

The differentiation outputs +Vg and −Vg are input to the output circuit 74. The output circuit 74 is configured by power transistors or MOS FETs 741 and 742 as final-stage output elements connected in reverse parallel between the lines u and v through diodes and resistors, and the bases or gates thereof are connected to the output side of the differentiation circuit 73 and applied with the above-described differentiation outputs +Vg and −Vg.

Herein, since there is provided no bias circuit in the bases or gates of the final-stage output elements 741 and 742, the output currents (the waveform "e" of FIG. 9) flowing to the final-stage output elements 741 and 742 become rectangular pulses +Id and −Id. As described in FIG. 8, the output current becomes a rectangular pulse which is symmetric with respect to the peak phase of the power source voltage V1 of the basic wave and has a width of τ. The pulse width τ of the rectangular pulses +Id and −Id can be arbitrarily adjusted by adjusting the time constant of the differentiation circuit 73.

Next, the power in the secondary winding w2 of the electric motor 14 described in FIG. 1 will be described in detail. First, a slipping will be described.

As described above, the 11th, 17th, and 23rd components in the rotational magnetic flux generated in the gap between the stator 14-1 and the rotor 14-2 are rotated in the backward direction with respect to the rotational magnetic flux of the basic wave. With this regard, the 13th, 19th, and 25th components are rotated in the forward direction. Herein, the speed of the rotational magnetic flux of the ν-th harmonic on the stator is set to Nν. The rotor is rotated at almost the synchronous speed N0 of the basic wave. A slipping Sν is obtained by the following Equation (3).

$$Sv=(Nv-N0)/Nv \qquad (3)$$

In the case of the backward rotational magnetic flux of the 11th, 17th, and 23rd components, +12, +18, and +24 are obtained as Sν values by substituting −1/11, −1/17, and −1/23 into Nν of Equation (3). In this case, the electric motor 14 is operated as a brake with respect to the harmonic components. In other words, the harmonic power of the corresponding degree flowing to the secondary winding w2 is not output to a load shaft, but consumed in the secondary winding w2.

In the case of the forward rotational magnetic flux of the 13th, 19th, and 25th components, the Sν values become −12, −18, and −24 based on Equation (3). In this case, the harmonic power of the corresponding degree flowing to the secondary winding w2 is similarly not output to the load shaft, but regenerated toward the power source and consumed mainly in the primary winding w1 of the electric motor 14 and the resistance of the trunk line 12.

Figure 10:
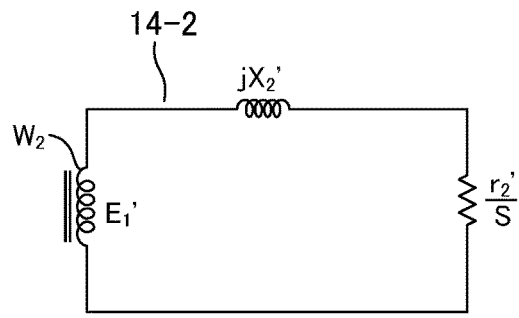
FIG. 10 is an equivalent circuit diagram for illustrating an induction voltage of a basic wave generated in the rotor of the electric motor illustrated in FIG. 1.

Next, the description will be made about the power of the basic wave in the secondary winding w2 of the electric motor 14. FIG. 10 is an equivalent circuit of the rotor 14-2 of the electric motor 14 illustrated in FIG. 1 in a case where the voltage E1' of the basic wave is induced in the secondary winding w2.

In FIG. 10, when a secondary input power of the basic wave is set to P1' and the slipping is set to S1, the secondary input power P1' is obtained by the following Equation (4).

[Expression 3]

$$P'_1 = \frac{(E'_1)^2 r_2}{\left(\frac{r_2}{S_1}\right)^2 + (X_2)^2} \qquad (4)$$

Herein, when r2=0.3Ω, x2=0.3Ω, S1=0.04 are assumed as an example of a 5.5 kw electric motor, P1' of Equation (4) is expressed as the following Equation (5).

$$P1'=0.0177(E1')^2 r_2 \qquad (5)$$

Next, the description will be made about the content rate of the harmonic voltage and the power consumption in the rotor 14-2 in a case where the harmonic causing the backward rotational magnetic flux is applied.

Figure 11:
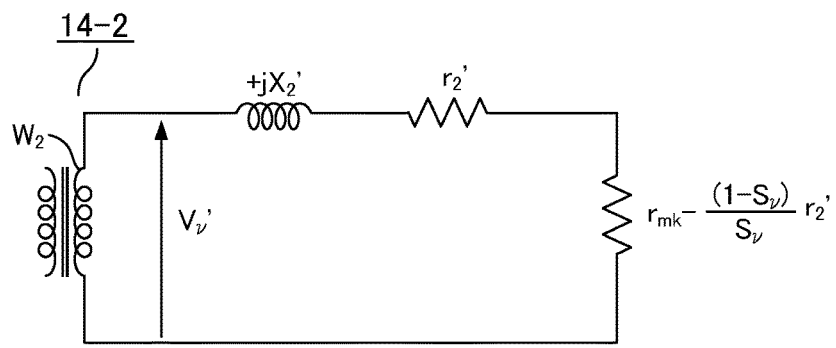
FIG. 11 is an equivalent circuit diagram for illustrating a harmonic voltage generated in the rotor of the electric motor illustrated in FIG. 1.

FIG. 11 illustrates an equivalent circuit of the secondary winding w2 in a case where the harmonic voltage Vν'(slot) generated in the rotor 14-2 of the electric motor 14 illustrated in FIG. 1 is induced in the secondary winding w2. When the content rate of the ν-th harmonic voltage Vν' with respect to the voltage E1' of the basic wave in the secondary winding w2 is set to Kν, Kν is expressed as Kν=Vν'/E1'. When a harmonic input power to the secondary winding w2 is set to Pν', the following Equation (6) is obtained based on FIG. 11.

[Expression 4]

$$P'_v = \frac{K_v^2 (E'_1)^2 r_2}{\left(\frac{r_2}{S_v}\right)^2 + (X_2)^2} \qquad (6)$$

Herein, when ν=17, Sν=+18 is obtained based on Equation (3) described above. Since r2=0.3Ω and x2=0.3Ω are set in the 5.5 kw electric motor as described above, the input power P17' of the 17th harmonic is obtained by substituting these values into Equation (6) as the following Equation (7).

$$P17'=11.1Kv^2 (E1')^2 r_2' \qquad (7)$$

When Kν=1.26% is substituted into the above Equation (7), P17' is obtained from the relation with respect to the above Equation (5), P17'=0.1P1' is obtained. In other words, when the content rate of the 17th harmonic voltage is 1.26%, about 10% of the basic wave is consumed by the resistance of the secondary winding w2.

Therefore, in this embodiment, as described in FIG. 4, the rotational magnetic flux φν(pls) of the harmonic having the opposite phase with respect to the rotational magnetic flux φν(slot) of the ν-th harmonic caused by the slot is generated based on the ν-th high frequency voltage Vν(pls) generated in the reactance circuit 15 by the harmonic current Iν(pls) from the harmonic current generator 16. Then, the rotational magnetic flux φν(slot) of the ν-th harmonic caused by the slot is lowered by the rotational magnetic flux φν(pls) of the harmonic having the opposite phase. When the rotational magnetic flux φν(slot) of the harmonic is lowered, the harmonic voltage Vν(slot) and the harmonic voltage Vν' (slot) induced in the secondary winding w2 by the harmonic voltage are reduced. As a result, it is possible to lower the power which is wastefully used in the secondary winding w2 by the harmonic voltage Vν'(slot).

Herein, as described above, the description has been made about cases that the 11th, 17th, and 23rd harmonic powers in the harmonic powers flowing into the secondary winding are consumed in the secondary winding w2, and the 13th, 19th, and 25th harmonic powers are regenerated toward the power source and consumed by the primary winding w1 of the electric motor 14 and the resistance of the trunk line 12.

Therefore, the power obtained by adding the harmonic power and the output power of the basic wave in the machine shaft is generally the input power of the electric motor 14.

In the above-described embodiment, the harmonic generation unit 13 described in FIG. 1 is provided in the power trunk line 12 derived from the power source transformer 11 to configure a power saving equipment in order to reduce the harmonic power. Therefore, the input power supplied from the power trunk line 12 to the electric motor 14 is reduced.

Figure 12:
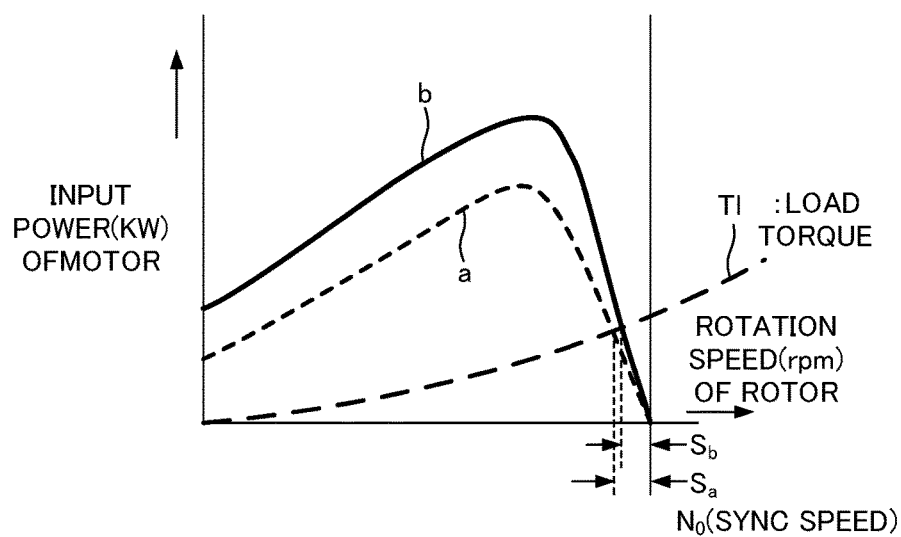
FIG. 12 is a characteristic diagram illustrating a relation between a rotation speed, an input power to a secondary winding, and a slipping of the electric motor used in the embodiment of the invention.

FIG. 12 is a characteristic diagram illustrating a relation between a rotation speed or a slipping of the electric motor and the input power to the secondary winding w2 of the electric motor 14. The characteristic before the above-described power saving equipment is introduced is shown as depicted by the curve "a", and moves as depicted by the curve "b" after the power saving equipment is introduced. Therefore, the slipping of the electric motor is reduced from Sa to Sb, and the input power to the electric motor 14 is reduced.

Table 1 shows the measurement results before and after the power saving equipment is introduced with respect to a 22 kw electric motor. As shown in Table 1, the input power to the electric motor is reduced by about 10% and the slipping is reduced by about 7% in about one month after the introduction. The rotation speed of the electric motor is increased as much as the reduced amount of the slipping.

TABLE 1

|  | Input Power (KW) of Motor | Slipping (%) | Rotation Speed (rpm) of Rotor |
|---|---|---|---|
| Before Introduction | 16.5 | 4.1 | 1439 |
| After Introduction | 14.8 | 3.8 | 1449 |

Figure 13:
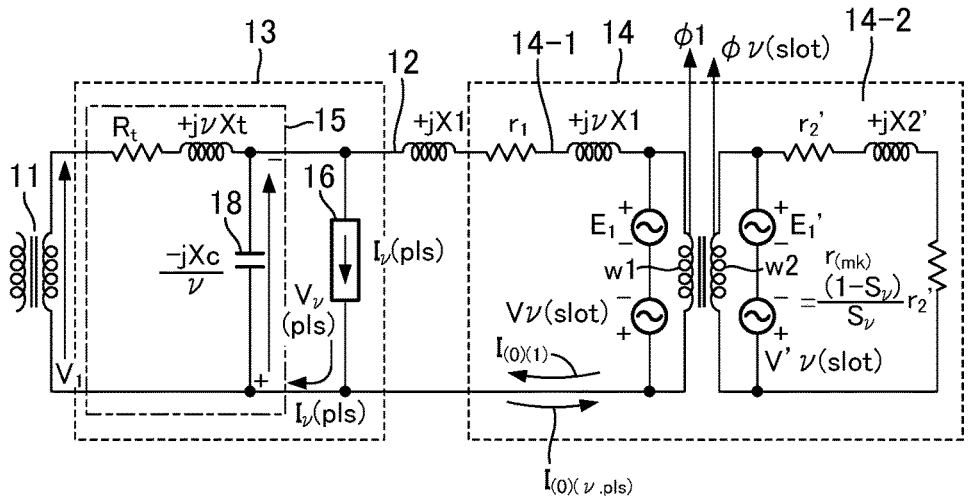
FIG. 13 is an equivalent circuit diagram illustrating a power equipment according to another embodiment of the invention.

Next, another embodiment of the invention will be described in detail with reference to FIG. 13. In this embodiment, as illustrated in FIG. 13, a capacitor 18 is added in the reactance circuit 15 illustrated in FIG. 1. In other words, the capacitor 18 is connected between the power trunk lines 12 and configures the reactance circuit 15 described below in FIG. 14 together with the resistance Rt and the reactance +jvXt of the power source transformer 11 described above. In other words, the capacitor 18 includes a capacitive reactance $-jXc/v$ and configures the reactance circuit 15 resonating with the 15th to 23rd (desirably, 16th to 20th) harmonics together with the resistance Rt and the reactance +jvXt of the power source transformer 11 described above.

In addition, the harmonic current generator 16 serving as a source of a pulse current Iv(pls) containing the v-th (11th, 17th, 23rd, and so on) harmonics is connected between the power trunk lines 12. The v-th harmonics contained in the pulse current Iv(pls) is amplified by the above-described reactance circuit 15.

Figure 14:
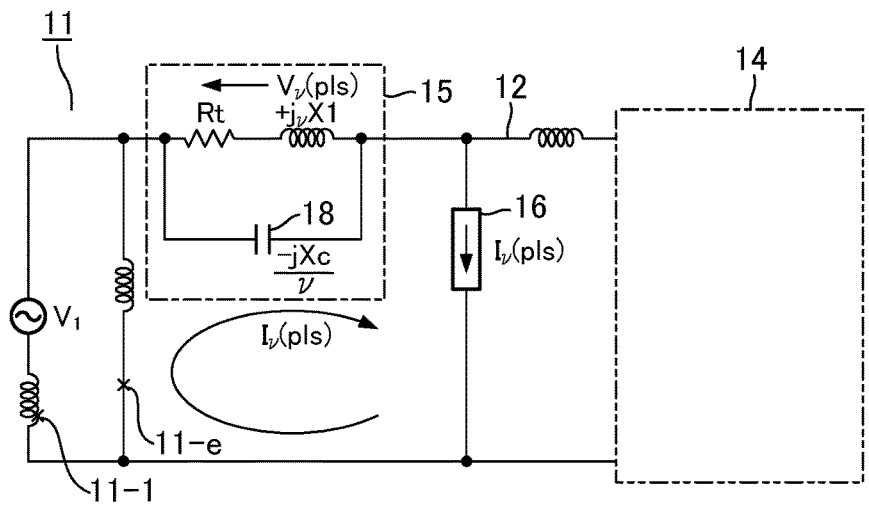
FIG. 14 is an equivalent circuit diagram in which a part of the equivalent circuit illustrated in FIG. 13 is redrawn.

Herein, the equivalent circuit of the transformer 11 and the reactance circuit 15 can be redrawn as illustrated in FIG. 14. In FIG. 14, since the primary leakage reactance 11-1 of the transformer 11 is remarkably smaller than the reactance 11-e of the excitation circuit of the transformer 11, the primary leakage reactance 11-1 is regarded as a short circuit. Therefore, the capacitor 18 is connected to the resistance Rt and the reactance +jvXt in parallel as illustrated in FIG. 14, and the reactance circuit 15 configures a parallel resonance circuit. In addition, a parallel impedance of the reactance circuit 15 is set to Zv(pall). When the pulse current Iv(pls) from the harmonic current generator 16 flows in the reactance circuit 15 in a direction depicted in the drawing, the power source voltage Vv(pls) of the harmonic is generated. In other words, the harmonic current generator 16 serves as a current source which supplies the v-th pulse current Iv(pls) for generating the power source voltage Vv(pls) of the harmonic.

Further, the capacitor 18 and the harmonic current generator 16 is provided in the vicinity of the power source transformer 11 as illustrated in FIG. 13, or is connected in the vicinity of the input terminal of the induction motor 14 which is connected to the terminal of the low-voltage trunk line 12.

Figure 15:
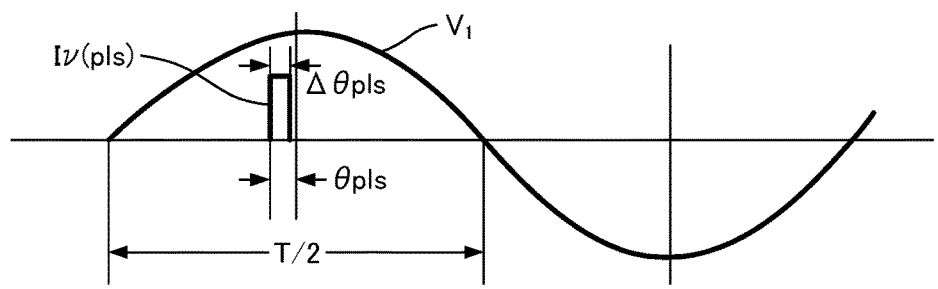
FIG. 15 is a waveform diagram illustrating a relation between the power source voltage in the apparatus of FIG. 13 and a harmonic current of a pulse wave.
Figure 16:
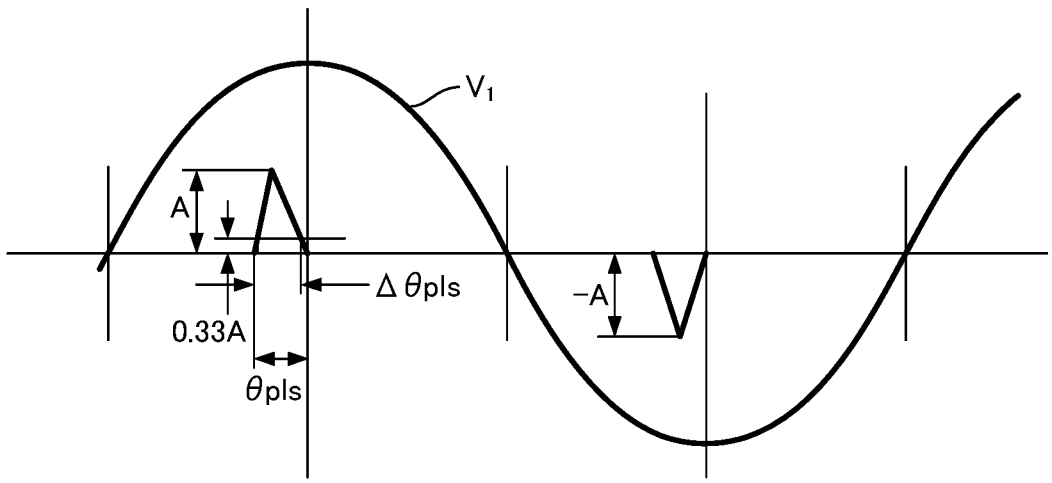
FIG. 16 is a waveform diagram illustrating a relation between the power source voltage in the apparatus of FIG. 13 and the harmonic current of the pulse wave.

In this embodiment, as illustrated in FIGS. 15 and 16, the rectangular pulse current Iv(pls), which rises at a phase advanced by θpls degrees with respect to the peak position of the power source voltage V1 and has a pulse width of Δθpls, flows from the harmonic current generator 16 connected to the power trunk line 12 to the reactance circuit 15. With this configuration, the harmonic voltage Vv(pls)=(−)Zv(pall)·Iv(pls) is generated by the parallel impedance Zv(pall) and amplified. In the v-th harmonic magnetic flux caused by the slot 21 described above, the rotational magnetic flux φv(pls) of the harmonic having the opposite phase with respect to the rotational magnetic flux φv(slot) of the 11th, 17th, and 23rd harmonics causing the backward rotation torque is generated by the harmonic voltage Vv(pls). With this configuration, the rotational magnetic flux φv(slot) of the harmonic is reduced, and the harmonic voltages Vv(slot) and Vv'(slot) generated by the rotational magnetic flux φv(slot) of the harmonic are reduced. As a result, it is possible to reduce the power which is wastefully consumed by the harmonic voltage Vv'(slot).

Figure 17A:
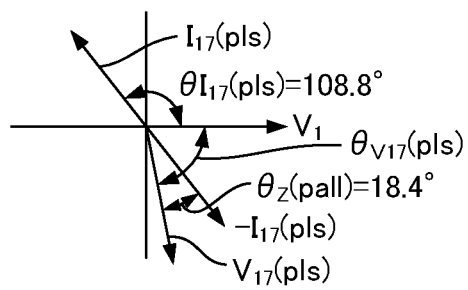
FIG. 17A is a vector diagram for illustrating an operation of the apparatus of FIG. 13 in a case where a 17th harmonic current of a rectangular wave is used.

Hereinafter, the above-described relation will be described using vector diagrams of FIGS. 17A, 17B, and 17C.

As described above, the pulse current Iv(pls), which rises at a phase advanced by θpls degrees with respect to the peak position of the power source voltage V1 and has a pulse width of Δθpls, flows from the harmonic current generator 16 connected to the power trunk line 12 to the reactance circuit 15 which includes the capacitor 18 connected in parallel and has the impedance Zv(pall). In other words, when the respective components I11(*pls*), I17(*pls*), and I23(*pls*) of the v-th pulse current Iv(pls) causing the above-described backward rotation torque flow to the reactance circuit 15, the harmonic voltage Vv(pls)=(−)Zv(pall)·Iv(pls) is generated and amplified.

First, a harmonic voltage V17(*pls*) generated by the component I17(*pls*) of the pulse current Iv(pls) will be described. When the harmonic voltage V17(*pls*) is applied to the primary winding w1 of the electric motor 14, the v-th excitation current I(0)(v,pls) (I(0)(17, pls)) flows to the primary winding w1 as illustrated in FIG. 13. Since the excitation current I(0)(17, pls) is delayed by 90° with respect to V17(*pls*), the rotational magnetic flux φv(pls) (that is, φ17(*pls*)) of the harmonic having the same phase as that of the excitation current I(0)(17, pls) is generated. The rotational magnetic flux φ17(*pls*) of the harmonic based on the pulse generator 16 has the opposite phase to the rotational magnetic flux φ17(slot) of the harmonic caused by the slot. Therefore, the rotational magnetic flux φ17(slot) of the harmonic caused by the slot is reduced, the harmonic voltage Vv(slot) generated by the rotational magnetic flux φ17(slot)

of the harmonic and the harmonic voltage V'v(slot) induced in the secondary winding w2 by the harmonic voltage are reduced. As a result, it is possible to reduce the power which is wastefully used by the harmonic voltage Vv'(slot).

Next, a parallel impedance Zv of the reactance circuit 15 will be described. In this embodiment, a resonant frequency v0 is set to cause resonance to the 17th harmonic. In other words, a capacitive reactance −jXc of the capacitor 18 illustrated in FIGS. 13 and 14 is determined to satisfy a resonant condition at v0=17.

Herein, since the 17th voltage in a case where a load is applied to the transformer 11 is increased by about 3 times when being applied to an actual load of the low-voltage trunk line of a 50 KVA to 500 KVA transformer, the sharpness of the resonance circuit is set to Q=3. In this way, when the sharpness is set to Q=3, and Xc=v02Xt and Q=v0Xt/Rt are used, a parallel impedance Z17(pall) is obtained by the following Equation (8).

[Expression 5]

$$Z_{17(pall)} = \frac{X_c X_t}{R_t} - j\frac{X_c}{V_0} = X_t v_0 (Q - j) \quad (8)$$

From Equation (8), the phase angle of the impedance Z17(pall) is delayed by 18.4°.

In the case of the 11th harmonic v11, when Xc=v02Xt=172Xt is substituted, a parallel impedance Z11 (pall) is obtained by the following Equation (9).

[Expression 6]

$$Z_{11(pall)} = \frac{\frac{-jXc}{V}(R_t + jVXt)}{\left(R_t + jVXt - j\frac{Xc}{V}\right)} = \frac{-jXc(R_t + jVXt)}{VR_t + j(V^2 Xt - Xc)} \quad (9)$$

$$= (16.77 + j15.31)Xt$$

From Equation (9), the phase angle at the time of resonance becomes θ11=42.4°.

In the case of the 23rd harmonic v23, a parallel impedance Z23(pall) is obtained by the following Equation (10) using the same calculation method.

$$Z23(pall) = 8.22 - j31.4 \quad (10)$$

From Equation (10), the phase angle at the time of resonance becomes θ23=75.3°.

Next, the harmonic voltage Vv(pls) generated in the reactance circuit 15 by the pulse current Iv(pls) from the harmonic current generator 16 will be described.

The pulse current Iv(pls) is a rectangular wave which is generated at a timing earlier than θpls from the timing of the peak value of the power source voltage V1 of the basic wave and has a width of Δθpls as illustrated in FIGS. 16, and 17A to 17C. FIG. 18 illustrates a result of the Fourier analysis performed by a computer in a case where the pulse current Iv(pls) is rectangular wave, a generation phase is θpls, and a width is Δθpls. The numerical values are listed in Table 2.

TABLE 2

Phases of Each Harmonic of Rectangular Pulse

| Pulse Waveform | θpls (°) | Δθpls (°) | 11th Spectrum Value | θI₁₁ (pls) (°) | θV₁₁ (pls) (°) | Determination | 17th Spectrum Value | θI₁₇ (pls) (°) | θV₁₇ (pls) (°) | Determination | 23rd Spectrum Value | θI₂₃ (pls) (°) | θV₂₃ (pls) (°) | Determination | Total Determination |
|---|---|---|---|---|---|---|---|---|---|---|---|---|---|---|---|
| Rectangular | 7.2 | 3.2 | 0.0702 | 54.4 | (—) 83.3 | ○ | 0.083 | 84.5 | (—) 113.9 | ○ | 0.076 | 113.2 | (—) 142.1 | X | X |
| | 7.2 | 5.4 | 0.0637 | 43.7 | (—) 94.0 | ○ | 0.0596 | 67.3 | (—) 131.1 | X | 0.05 | 92.3 | (—) 163.0 | X | X |
| | 8.1 | 4.5 | 0.0106 | 48.8 | (—) 88.9 | ○ | 0.102 | 87.1 | (—) 105.5 | ○ | 0.093 | 126.3 | (—) 129.2 | X | X |
| | 8.1 | 5.0 | 0.0546 | 61.6 | (—) 76.1 | ○ | 0.0521 | 93.3 | (—) 105.1 | ○ | 0.046 | 124.4 | (—) 130.9 | X | X |
| | 8.1 | 5.4 | 0.0133 | 55.7 | (—) 82.0 | ○ | 0.122 | 80.5 | (—) 117.9 | X | 0.098 | 114.0 | (—) 141.0 | X | X |
| | 9 | 3.2 | | | | | | | | | | | | | |
| | 9 | 4 | 0.044 | 76.9 | (—) 60.8 | ○ | 0.041 | 119.1 | (—) 79.3 | ○ | 0.039 | 161.3 | (—) 94.0 | ○ | ○ |
| | 9 | 5 | 0.053 | 72.6 | (—) 65.1 | ○ | 0.050 | 108.8 | (—) 89.6 | ○ | 0.047 | 149.1 | (—) 106.3 | ○ | ○ |
| | 9 | 6 | 0.061 | 65.9 | (—) 71.8 | ○ | 0.057 | 102.1 | (—) 96.3 | ○ | 0.051 | 138.2 | (—) 117.1 | ○ | ○ |
| | 9 | 7 | 0.073 | 60.3 | (—) 77.4 | ○ | 0.063 | 91.8 | (—) 106.6 | ○ | 0.054 | 129.0 | (—) 129.3 | X | X |
| | 10.0 | 5.0 | 0.053 | 82.5 | (—) 55.2 | X | 0.05 | 126.9 | (—) 71.5 | ○ | 0.046 | 173.8 | (—) 81.5 | ○ | X |
| | 10.0 | 6.0 | 0.063 | 61.5 | (—) 61.5 | ○ | 0.057 | 117.6 | (—) 81.3 | ○ | 0.051 | 161.9 | (—) 93.4 | ○ | ○ |
| | 10.0 | 7.0 | 0.071 | 71.1 | (—) 66.6 | ○ | 0.056 | 112.6 | (—) 85.5 | ○ | 0.053 | 149.6 | (—) 105.7 | ○ | ○ |
| | 10.0 | 8.0 | 0.08 | 65.7 | (—) 72.0 | ○ | 0.068 | 100.4 | (—) 97.4 | ○ | 0.053 | 138.8 | (—) 116.5 | ○ | ○ |
| | 10.0 | 9.0 | 0.076 | 59.9 | (—) 77.8 | ○ | 0.067 | 103.0 | (—) 95.4 | ○ | 0.054 | 126.7 | (—) 128.6 | X | X |
| | 10.8 | 5.5 | 0.053 | 82.0 | (—) 55.4 | X | 0.051 | 127.1 | (—) 71.3 | ○ | 0.046 | 172.6 | (—) 82.9 | ○ | X |
| | 10.8 | 6.5 | 0.064 | 77.3 | (—) 60.4 | ○ | 0.059 | 118.3 | (—) 80.1 | ○ | 0.052 | 159.8 | (—) 95.5 | ○ | ○ |
| | 10.8 | 7.2 | 0.071 | 72.1 | (—) 65.6 | ○ | 0.121 | 110.0 | (—) 88.3 | ○ | 0.056 | 146.3 | (—) 105 | ○ | ○ |
| | 10.8 | 8.2 | 0.082 | 66.3 | (—) 71.4 | ○ | 0.068 | 101 | (—) 97.4 | ○ | 0.049 | 146.6 | (—) 108.7 | ○ | ○ |
| | 10.8 | 9.0 | 0.088 | 60.0 | (—) 77.7 | ○ | 0.0731 | 92.4 | (—) 106.0 | ○ | 0.054 | 127.5 | (—) 127.8 | X | X |
| | 10.8 | 10.0 | 0.094 | 77.1 | (—) 60.6 | ○ | 0.0738 | 118.3 | (—) 80.1 | ○ | 0.050 | 172.6 | (—) 92.7 | ○ | ○ |

Table 2 shows phases of the harmonic voltage Vv(pls) calculated using the phase angle of each Iv(pls) and the phase angle of the reactance circuit 15 in each harmonic. Then, when the phase is delayed by 90° within ±30° with respect to the power source voltage V1, the phase falls within a range of the opposite phase to Vv(slot) caused by the slot, and thus the phase is considered to lower the opposite phase and determined as "Good".

Figure 18:
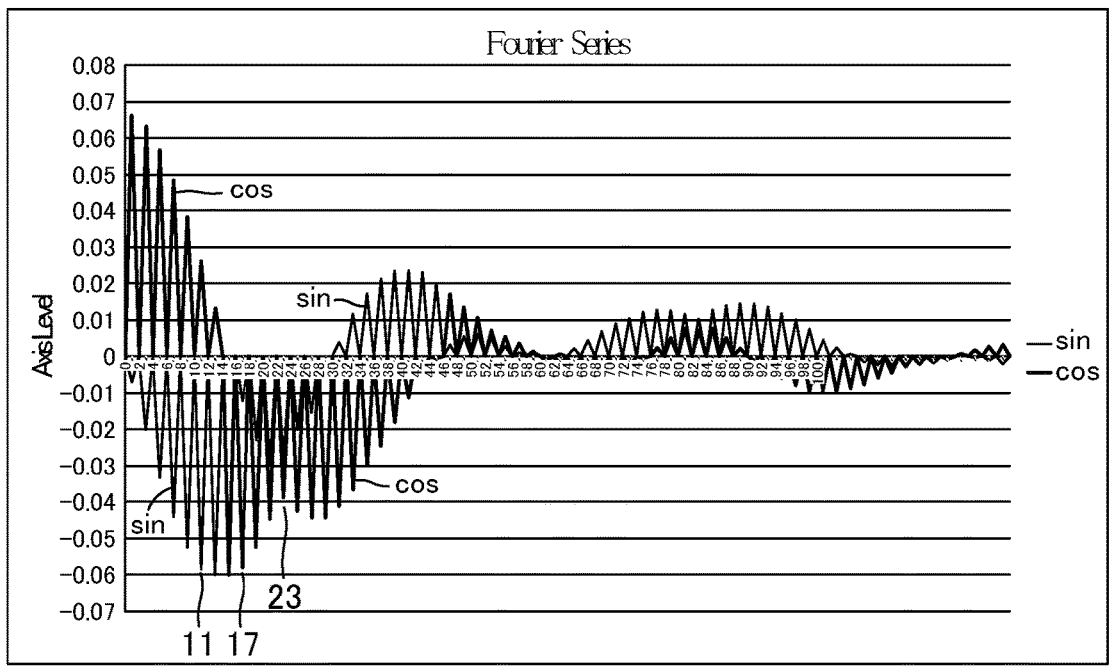
FIG. 18 is a diagram illustrating a result of a Fourier analysis performed on the rectangular wave used in the apparatus of FIG. 13.
Figure 19A:
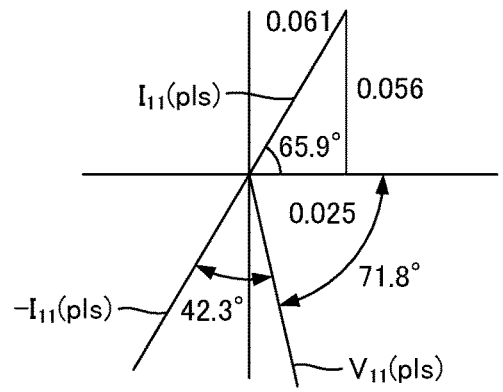
FIG. 19A is a vector diagram for illustrating the analysis result in FIG. 18 in a case where the 11th harmonic current of the rectangular wave is used.

FIG. 18 shows a case where the generation phase of the rectangular wave is set to θpls=+9°, a width is set to Δθpls=6°, and an increment is set to 0.05°. A vector relation of the 11th harmonic is shown in FIG. 19A, a vector relation of the 17th harmonic in FIG. 19B, and a vector relation of the 23rd harmonic in FIG. 19C.

Figure 19B:
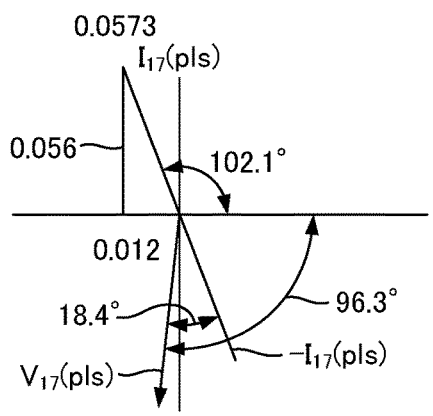
FIG. 19B is a vector diagram for illustrating the analysis result in FIG. 18 in a case where the 17th harmonic current of the rectangular wave is used.
Figure 19C:
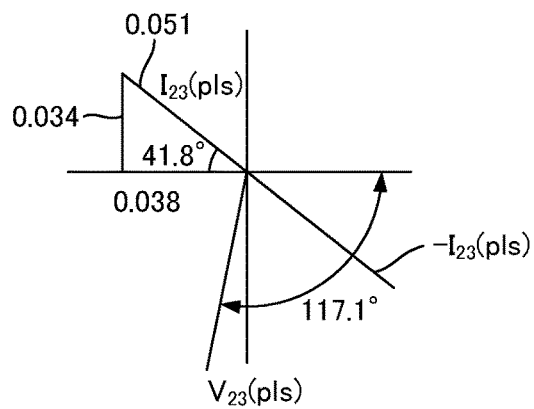
FIG. 19C is a vector diagram for illustrating the analysis result in FIG. 18 in a case where the 23rd harmonic current of the rectangular wave is used.

Herein, making a description on the 17th harmonic, the sin value is 0.056 and the cos value is 0.012 as shown from FIG. 19B and the corresponding columns of Table 2, and the spectrum value of I17(*pls*) is 0.057 as shown in the corresponding column of Table 2. The 17th harmonic is advanced by 102.1° with respect to the power source voltage V1. The harmonic voltage Vv(pls) is Vv(pls)=(−)Zv(pall)·Iv(pls), and a phase angle θZ(pall) of the impedance Z17(pall) is delayed by 18.4°, and thus the phase angle of the harmonic voltage V17(*pls*) comes to be delayed by 96.3°.

Table 2 collectively shows the Fourier analysis results illustrated in FIG. 18 with respect to the rectangular waves having different phases and pulse widths. For example, the respective vectors of the 17th harmonic contained in the pulse current Iv(pls) in a case where the pulse phase θpls is 9.0° and the pulse width Δθpls is 5.0° in Table 2 is illustrated in FIG. 17A.

As a result of decomposing the Fourier series, as shown in Table 2, the rectangular pulse I17(*pls*) is advanced by θI17*pls*=108.8° with respect to the power source voltage V1 in a case where the pulse width Δθpls is 5.0°. In addition, since the phase angle θZ(pall) of the impedance Z17(pall) is 18.4°, the harmonic voltage Vv(pls) is delayed by 18.4° with respect to −I17(*pls*). Therefore, when the phase of the harmonic voltage V17(*pls*) is set to θV17(*pls*), θV17(*pls*) is obtained as follows:

$$\theta V17(pls) = (-)\{180° - \theta I17(pls) + \theta Z(pall)\} = -89.6°$$

In other words, the harmonic voltage V17(*pls*) is delayed by 89.6° with respect to the power source voltage V1, and has almost the opposite phase to Vv(slot) advanced by 90° with respect to the power source voltage V1, so that the harmonic voltage Vv(slot) can be lowered.

Figure 17B:
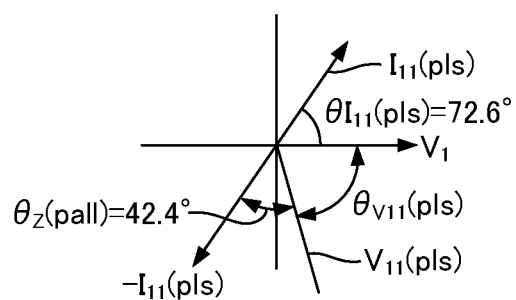
FIG. 17B is a vector diagram for illustrating an operation of the apparatus of FIG. 13 in a case where an 11th harmonic current of the rectangular wave is used.

In a case where the pulse phase θpls is 9.0° and the pulse width Δθpls is 5.0°, the respective vectors of the 11th harmonic are illustrated in FIG. 17B. In other words, the phase of the 11th component of the pulse current Iv(pls) is advanced by θI11*pls*=72.6° with respect to the power source voltage V1. In addition, since the phase angle θZ(pall) of the impedance Z11(pall) is advanced by 42.4°, the harmonic voltage Vv(pls) is advanced by 42.4° with respect to −I11 (*pls*). Therefore, when the phase of a harmonic voltage V11(*pls*) is set to θV11(*pls*), θV11(*pls*) is obtained as follows:

$$\theta V11(pls) = (-)\{180° - \theta I11(pls) - \theta Z(pall)\} = -65.1°$$

In other words, the harmonic voltage V11(*pls*) is delayed 65.1° with respect to the power source voltage V1. Even in this case, the harmonic voltage V11(*pls*) has almost the opposite phase to Vv(slot) advanced by 90° with respect to the power source voltage V1, so that the harmonic voltage Vv(slot) can be lowered.

Figure 17C:
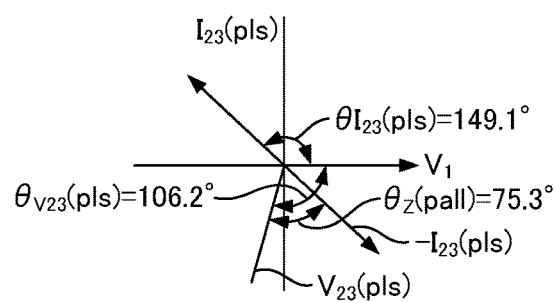
FIG. 17C is a vector diagram for illustrating an operation of the apparatus of FIG. 13 in a case where a 23rd harmonic current of the rectangular wave is used.

In a case where the pulse phase θpls is 9.0° and the pulse width Δθpls is 5.0°, the respective vectors of the 23rd harmonic are illustrated in FIG. 17C. In other words, the phase of the 23rd component of the pulse current Iv(pls) is advanced by θI23*pls*=149.1° with respect to the power source voltage V1. In addition, since the phase angle θZ(pall) of the impedance Z23(pall) is delayed by 75.3°, the harmonic voltage Vv(pls) is delayed by 75.3° with respect to −I23(*pls*). Therefore, when the phase of a harmonic voltage V23(*pls*) is set to θ23(*pls*), θV23(*pls*) is obtained as follows:

$$\theta V23(pls) = (-)\{180° - \theta 23(pls) + \theta Z(pall)\} = -106.2°$$

In other words, the harmonic voltage V23(*pls*) is delayed by 106.2° with respect to the power source voltage V1. Even in this case, the harmonic voltage V23(*pls*) has almost the opposite phase to Vv(slot) advanced by 90° with respect to the power source voltage V1, so that the harmonic voltage Vv(slot) can be lowered.

In this way, in a case where the pulse phase θpls is 9.0° and the pulse width Δθpls is 5.0°, the 11th, 17th, and 23rd harmonic voltages V11(*pls*), V17(*pls*), and V23(*pls*) are all delayed by 90° within ±30° with respect to the power source voltage V1. In other words, the harmonic component has almost the opposite phase with respect to the harmonic voltage Vv(slot) caused by the slot. Therefore, the harmonic component can effectively lower the harmonic voltage Vv(slot), so that the component is evaluated as "Good" in Table 2.

In other words, the harmonic component is evaluated as "Good" when the pulse width Δθpls is in a range from 4 to 6° in a case where the pulse current Iv(pls) is a rectangular wave and the pulse phase θpls is 9.0°; when the pulse width Δθpls is in a range from 6 to 8° in a case where the pulse phase θpls is 10.0°; when the pulse width Δθpls is in a range from 6.5 to 8.2° in a case where the pulse phase θpls is 10.8°.

Next, the description will be made about an exponential wave having a width of Δθpls, in which the harmonic current Iv(pls) from the harmonic current generator 16 connected to the power trunk line 12 rises at a phase advanced by θpls degrees with respect to the peak position of the power source voltage V1. Even in this case, the harmonic voltage Vv(pls)= (−)Zv(pall)·Iv(pls) is generated by the parallel impedance Zv(pall) while supplying an exponential wave Iv(pls) to the reactance circuit 15, and amplified.

Figure 20:
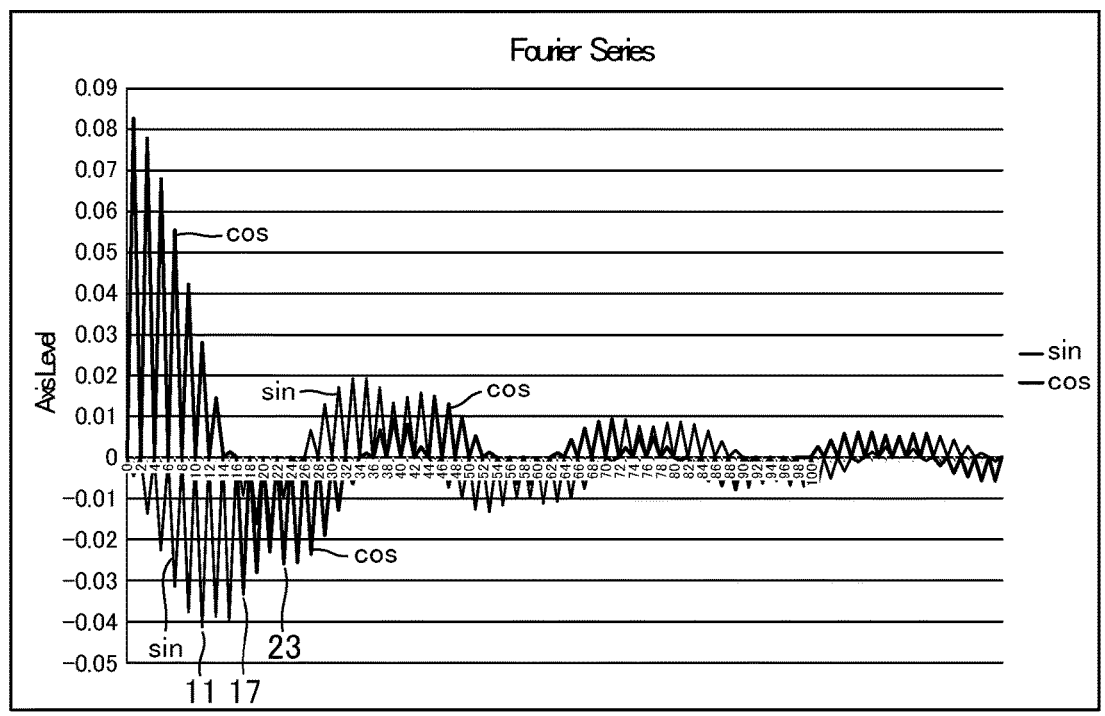
FIG. 20 is a diagram illustrating a result of the Fourier analysis performed on an exponential wave used in the apparatus of FIG. 13.

FIG. 20 illustrates a result of the Fourier analysis performed on the exponential wave by a computer, and the numerical values are listed in Table 3.

TABLE 3

Phase of Exponential Pulse Waveform

| Pulse Waveform | θpls (°) | Δθpls (°) | 11th | | | | 17th | | | | 23rd | | | | Total |
|---|---|---|---|---|---|---|---|---|---|---|---|---|---|---|---|
| | | | Spectrum Value | θI$_{11}$ (pls) (°) | θV$_{11}$ (pls) (°) | Determination | Spectrum Value | θI$_{17}$ (pls) (°) | θV$_{17}$ (pls) (°) | Determination | Spectrum Value | θI$_{23}$ (pls) (°) | θV$_{23}$ (pls) (°) | Determination | Determination |
| Exponential Func- | 7 | 1 | 0.0177 | 64.9 | (—) 72.8 | ○ | 0.0166 | 96.9 | (—) 101.5 | ○ | 0.0178 | 141.8 | (—) 113.5 | ○ | ○ |
| | 7 | 2 | 0.0266 | 55.7 | (—) 82.0 | ○ | 0.024 | 85.2 | (—) 113.2 | ○ | 0.0216 | 123.7 | (—) 131.6 | X | X |
| | 7 | 3 | 0.0332 | 46.2 | (—) 91.5 | ○ | 0.0277 | 77.5 | (—) 149.1 | X | 0.024 | 106.9 | (—) 148.4 | X | X |

TABLE 3-continued

Phase of Exponential Pulse Waveform

| Pulse Waveform | θpls (°) | Δθpls (°) | 11th Spectrum Value | θI₁₁ (pls) (°) | θV₁₁ (pls) (°) | Determination | 17th Spectrum Value | θI₁₇ (pls) (°) | θV₁₇ (pls) (°) | Determination | 23rd Spectrum Value | θI₂₃ (pls) (°) | θV₂₃ (pls) (°) | Determination | Total Determination |
|---|---|---|---|---|---|---|---|---|---|---|---|---|---|---|---|
| tion | 7 | 6 | 0.048 | 27.4 | (—) 110.3 | ○ | 0.036 | 57.7 | (—) 140.7 | X | 0.027 | 94.2 | (—) 161.1 | X | X |
| | 8 | 1 | 0.017 | 80.0 | (—) 57.7 | X | 0.0168 | 116.6 | (—) 81.8 | ○ | 0.017 | 162.6 | (—) 92.7 | ○ | X |
| | 8 | 2 | 0.027 | 66.3 | (—) 71.5 | ○ | 0.024 | 99.5 | (—) 98.9 | ○ | 0.025 | 143.7 | (—) 111.6 | ○ | ○ |
| | 8 | 3 | 0.028 | 57.3 | (—) 80.4 | ○ | 0.029 | 93.9 | (—) 104.5 | ○ | 0.025 | 133.4 | (—) 121.9 | X | X |
| | 8 | 4 | 0.040 | 51.1 | (—) 86.6 | ○ | 0.032 | 85.5 | (—) 112.9 | ○ | 0.027 | 124.3 | (—) 131.0 | X | X |
| | 8 | 5 | | | | | | | | | | | | | |
| | 9 | 2 | 0.026 | 76.5 | (—) 61.2 | X | 0.027 | 120.8 | (—) 77.6 | ○ | 0.025 | 172.2 | (—) 83.1 | ○ | X |
| | 9 | 4 | 0.040 | 60.3 | (—) 77.4 | ○ | 0.032 | 98.9 | (—) 99.5 | ○ | 0.026 | 147.5 | (—) 107.8 | ○ | ○ |
| | 9 | 6 | 0.044 | 48.5 | (—) 89.2 | ○ | 0.034 | 91.6 | (—) 106.8 | ○ | 0.027 | 139.4 | (—) 115.9 | ○ | ○ |
| | 9 | 8 | 0.047 | 42.6 | (—) 95.1 | ○ | 0.035 | 85.2 | (—) 113.2 | ○ | 0.028 | 132.1 | (—) 123.2 | X | X |
| | 9 | 9 | 0.033 | 38.2 | (—) 99.5 | ○ | 0.053 | 83.7 | (—) 114.7 | ○ | 0.046 | 132.1 | (—) 123.2 | X | X |
| | 10 | 3 | 0.033 | 79.7 | (—) 58.0 | X | 0.029 | 127.3 | (—) 71.1 | ○ | 0.025 | 176.6 | (—) 78.7 | X | |
| | 10 | 4 | 0.04 | 71.6 | (—) 66.1 | ○ | 0.031 | 118.6 | (—) 79.8 | ○ | 0.026 | 173.4 | (—) 81.9 | ○ | ○ |
| | 10 | 7 | 0.049 | 56.1 | (—) 81.6 | ○ | 0.036 | 104.4 | (—) 94.0 | ○ | 0.027 | 158.2 | (—) 97.1 | ○ | ○ |
| | 10 | 20 | 0.055 | 34.5 | (—) 103.2 | ○ | 0.036 | 88.4 | (—) 110 | ○ | 0.029 | 146.9 | (—) 108.4 | ○ | ○ |
| | 10.8 | 3 | 0.025 | 80.9 | (—) 56.8 | X | 0.021 | 126.6 | (—) 71.8 | ○ | 0.019 | 173.0 | (—) 78.3 | ○ | X |
| | 10.8 | 4 | 0.033 | 72.1 | (—) 65.6 | ○ | 0.026 | 119.5 | (—) 78.9 | ○ | 0.022 | 173.5 | (—) 81.8 | ○ | ○ |
| | 10.8 | 7 | 0.044 | 55.2 | (—) 82.5 | ○ | 0.032 | 102.7 | (—) 95.7 | ○ | 0.024 | 160.8 | (—) 94.5 | ○ | ○ |
| | 10.8 | 10.8 | 0.05 | 45.0 | (—) 92.7 | ○ | 0.035 | 94.1 | (—) 104.3 | ○ | 0.026 | 152.4 | (—) 102.9 | ○ | ○ |
| | 10.8 | 15 | 0.053 | 38.2 | (—) 99.5 | ○ | 0.035 | 91.6 | (—) 106.8 | ○ | 0.026 | 147.5 | (—) 107.7 | ○ | ○ |
| | 12.6 | 5 | 0.039 | 87.1 | (—) 50.6 | X | 0.029 | 149 | (—) 49.4 | X | 0.025 | 211.8 | (—) 43.5 | X | X |
| | 12.6 | 10 | 0.05 | 69.0 | (—) 68.7 | ○ | 0.035 | 132.7 | (—) 65.7 | ○ | 0.026 | 197.7 | (—) 57.6 | X | X |
| | 12.6 | 15 | 0.047 | 61.0 | (—) 76.7 | ○ | 0.037 | 126.0 | (—) 72.1 | ○ | 0.027 | 196.1 | (—) 59.2 | X | X |

Table 3 shows, similarly to Table 2, phases of the harmonic voltage Vv(pls) calculated using the phase angle of each Iv(pls) and the phase angle of the reactance circuit 15 in each harmonic. Then, when the phase is delayed by 90° within ±30° with respect to the power source voltage V1, the phase falls within a range of the opposite phase to Vv(slot) caused by the slot, and thus the phase is considered to lower the opposite phase and thus determined as "Good".

Figure 21A:
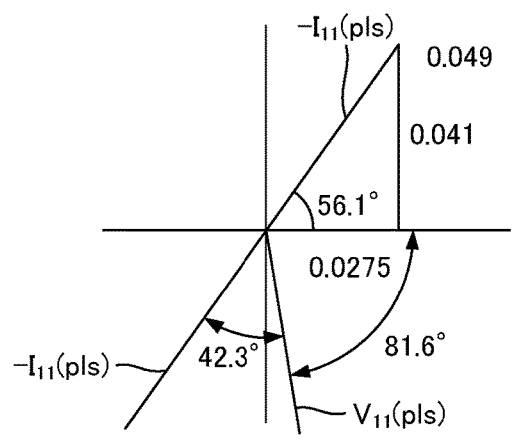
FIG. 21A is a vector diagram for illustrating the analysis result in FIG. 20 in a case where the 11th harmonic current of the exponential wave is used.
Figure 21B:
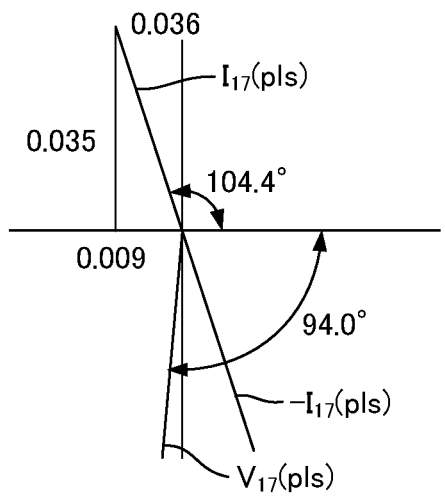
FIG. 21B is a vector diagram for illustrating the analysis result of FIG. 20 in a case where the 17th harmonic current of the exponential wave is used.
Figure 21C:
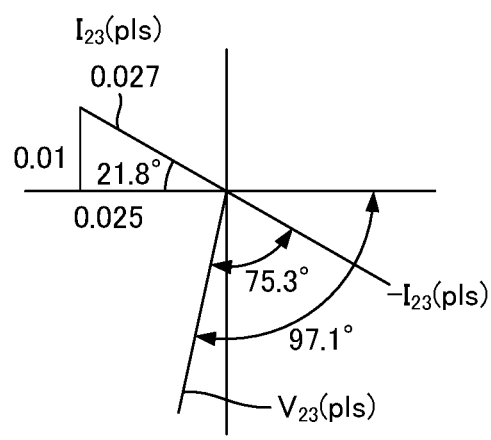
FIG. 21C is a vector diagram for illustrating the analysis result in FIG. 20 in a case where the 23rd harmonic current of the exponential wave is used.

FIG. 20 shows a case where the generation phase of the exponential wave is set to θpls=+10°, a width is set to Δθpls=7°, and an increment is set to 0.05°. A vector relation of the 11th harmonic is shown in FIG. 21A, a vector relation of the 17th harmonic in FIG. 21B, and a vector relation of the 23rd harmonic in FIG. 21C.

Herein, making a description on the 17th harmonic, the sin value is 0.035 and the cos value is 0.009, and the spectrum value of I17(pls) is 0.036 as shown from the corresponding columns of Table 3. The 17th harmonic is advanced by 104.4° with respect to the power source voltage V1. The harmonic voltage Vv(pls) is Vv(pls)=(−)Zv(pall)·Iv(pls), a phase angle θZ(pall) of the impedance Z17(pall) is delayed by 18.4°, and thus the phase angle of the harmonic voltage V17(pls) comes to be delayed by 94.0°.

Table 3 collectively shows the Fourier analysis results illustrated in FIG. 20 with respect to the exponential waves having different phases and pulse widths.

As a result of decomposing the Fourier series, as shown in Table 3, the exponential wave pulse I17(pls) is advanced by θ17(pls)=104.4° with respect to the power source voltage v1 in a case where the pulse phase θpls is 10.0° and the pulse width Δθpls is 7.0°. In addition, since the phase angle θZ(pall) of the impedance Z17(pall) is 18.4°, the harmonic voltage Vv(pls) is delayed by 18.4° with respect to −I17 (pls). Therefore, when the phase of the harmonic voltage V17(pls) is set to θV17(pls), θV17(pls) is obtained as follows:

$$\theta V17(pls)=(-)\{180°-\theta17(pls)+\theta Z(pall)\}=-94.0°$$

In other words, the harmonic voltage V17(pls) has a phase delayed by 94.0° with respect to the power source voltage V1.

The 11th and 23rd harmonics can be similarly calculated from the values of Table 3. In other words, the harmonic voltage V11(pls) in the 11th harmonic becomes −81.6°, and the harmonic voltage V23(pls) in the 23rd harmonic becomes −97.1°. These values of both degrees all fall within a range of −90°±30°, and thus determined as "Good" for lowering the harmonic voltage Vv(slot) caused by the slot.

Therefore, the harmonic component is evaluated as "Good" when the width Δθpls is 1° in a case where the harmonic current Iv(pls) is an exponential wave and the phase θpls is 7.0°; when the width Δθpls is 2° in a case where the phase θpls is 8°; when the width Δθpls is in a range from 4 to 6° in a case where the phase θpls is 9°; when the width Δθpls is in a range from 4 to 6° in a case where the phase θpls is 9°; when the width Δθpls is in a range from 4 to 20° in a case where the phase θpls is 10°; and when the width Δθpls is 4 to 15° in a case where the phase θpls is 10.8°.

Next, the description will be made about a triangular wave having a width of Δθpls, in which the harmonic current Iv(pls) from the harmonic current generator 16 connected to the power trunk line 12 rises at a phase advanced by θpls degrees with respect to the peak position of the power source voltage V1. Even in this case, the harmonic voltage Vv(pls)= (−)Zv(pall)·Iv(pls) is generated by the parallel impedance Zv(pall) while supplying an exponential wave Iv(pls) to the reactance circuit 15, and amplified.

Figure 22:
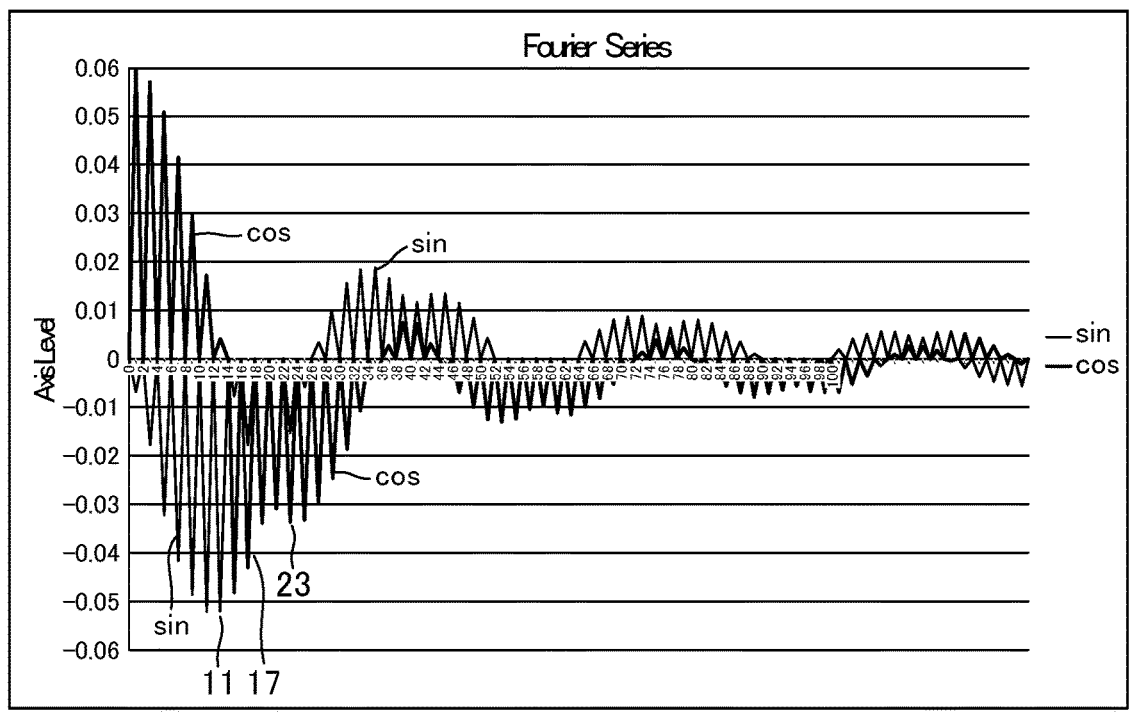
FIG. 22 is a diagram illustrating a result of the Fourier analysis performed on a triangular wave used in the apparatus of FIG. 13.

FIG. 22 illustrates a result of the Fourier analysis performed on the triangular wave by a computer, and the numerical values are listed in Table 4.

of ±30°, but the phase angle of the 11th harmonic is 53.1°. The entire evaluation over the 11th, 17th, and 23rd harmonics is not determined as "Good".

TABLE 4

Phase of Triangular Pulse Waveform

| Pulse Waveform | θpls (°) | Δθpls (°) | 11th Spectrum Value | θI₁₁ (pls) (°) | θV₁₁ (pls) (°) | Determination | 17th Spectrum Value | θI₁₇ (pls) (°) | θV₁₇ (pls) (°) | Determination | 23rd Spectrum Value | θI₂₃ (pls) (°) | θV₂₃ (pls) (°) | Determination | Total Determination |
|---|---|---|---|---|---|---|---|---|---|---|---|---|---|---|---|
| Triangular Wave | 7 | | | | | | | | | | | | | | |
| | 7 | | | | | | | | | | | | | | |
| | 8 | 4 | | | | | | | | | | | | | |
| | 8 | 5 | 0.033 | 67.4 | (—) 70.3 | ○ | 0.031 | 101.3 | (—) 97.1 | ○ | 0.029 | 141.3 | (—) 114.0 | ○ | ○ |
| | 8 | 8 | 0.052 | 47.4 | (—) 89.7 | ○ | 0.042 | 88.6 | (—) 109.8 | ○ | 0.036 | 120.1 | (—) 135.2 | X | X |
| | 8 | 6 | 0.037 | 64.1 | (—) 73.6 | ○ | 0.035 | 98.1 | (—) 100.3 | ○ | 0.032 | 135.0 | (—) 120.3 | ○ | ○ |
| | 8 | | | | | | | | | | | | | | |
| | 9 | | | | | | | | | | | | | | |
| | 9 | 8 | 0.046 | 67.9 | (—) 69.7 | ○ | 0.042 | 74.0 | (—) 124.4 | X | 0.036 | 35.9 | (—) 68.8 | ○ | X |
| | 9 | 9 | 0.067 | 63.9 | (—) 73.8 | ○ | 0.044 | 82.2 | (—) 116.2 | ○ | 0.035 | 138.5 | (—) 116.8 | ○ | ○ |
| | 9 | 10 | 0.054 | 60.1 | (—) 77.5 | ○ | 0.046 | 93.7 | (—) 104.7 | ○ | 0.037 | 132.8 | (—) 122.5 | X | X |
| | 9 | 11 | 0.059 | 57.4 | (—) 80.2 | ○ | 0.048 | 91.2 | (—) 107.2 | ○ | 0.036 | 128.2 | (—) 127.1 | X | X |
| | 9 | 12 | | | | | | | | | | | | | |
| | 10 | 10 | 0.053 | 84.6 | (—) 53.1 | X | 0.046 | 112.1 | (—) 86.3 | ○ | 0.036 | 155.6 | (—) 99.7 | ○ | X |
| | 10 | 11 | 0.058 | 67.8 | (—) 69.9 | ○ | 0.047 | 108.4 | (—) 90.0 | ○ | 0.035 | 151.3 | (—) 104.0 | ○ | ○ |
| | 10 | 12 | | | | | | | | | | | | | |
| | 10 | 18 | 0.074 | 45.5 | (—) 92.1 | ○ | 0.043 | 83.4 | (—) 115.0 | ○ | 0.026 | 144.5 | (—) 110.8 | ○ | ○ |
| | 10 | 22 | 0.075 | 34.4 | (—) 103.3 | ○ | 0.0355 | 80.3 | (—) 116.5 | ○ | 0.028 | 152.5 | (—) 102.8 | ○ | ○ |
| | 10.8 | 9 | 0.043 | 77.9 | (—) 59.7 | X | 0.038 | 121.6 | (—) 74.6 | ○ | 0.033 | 169.4 | (—) 185.9 | ○ | X |
| | 10.8 | | | | | | | | | | | | | | |
| | 10.8 | 10.8 | 0.051 | 71.5 | (—) 66.0 | ○ | 0.043 | 110.6 | (—) 87.8 | ○ | 0.034 | 157.2 | (—) 98.1 | ○ | ○ |
| | 10.8 | 10 | | 74.5 | (—) 63.2 | ○ | | 115.7 | (—) 83.1 | ○ | | 159.4 | (—) 95.9 | ○ | ○ |
| | 10.8 | 26.0 | 0.070 | 27.3 | (—) 110.4 | ○ | 0.032 | 86.4 | (—) 102.6 | ○ | 0.029 | 149 | (—) 106.3 | ○ | ○ |
| | 10.8 | 30.0 | 0.062 | 21.6 | (—) 116.0 | ○ | 0.035 | 93.3 | (—) 105.1 | ○ | 0.028 | 140.7 | (—) 114.6 | ○ | ○ |
| | 12.6 | | | | | | | | | | | | | | |
| | 12.6 | 22 | 0.072 | 58.1 | (—) 79.5 | ○ | 0.036 | 113.0 | (—) 85.4 | ○ | 0.026 | 197.7 | (—) 57.6 | X | X |
| | 12.6 | 25 | 0.071 | 50.7 | (—) 86.9 | ○ | 0.032 | 114.9 | (—) 83.5 | ○ | 0.029 | 195.0 | (—) 60.3 | ○ | ○ |
| | 12.6 | 28 | 0.066 | 45.0 | (—) 92.7 | ○ | 0.033 | 125.1 | (—) 73.3 | ○ | 0.030 | 189.5 | (—) 65.8 | ○ | ○ |
| | 12.6 | 30 | 0.062 | 43.7 | (—) 93.9 | ○ | 0.036 | 125.9 | (—) 72.5 | ○ | 0.028 | 186.1 | (—) 69.2 | X | X |

Table 4 shows, similarly to Table 2, phases of the harmonic voltage Vν(pls) calculated using the phase angle of each Iν(pls) and the phase angle of the reactance circuit 15 in each harmonic. Then, when the phase is delayed by 90° within ±30° with respect to the power source voltage V1, the phase falls within a range of the opposite phase to Vν(slot) caused by the slot, and thus the phase is considered to lower the opposite phase and thus determined as "Good".

Figure 23A:
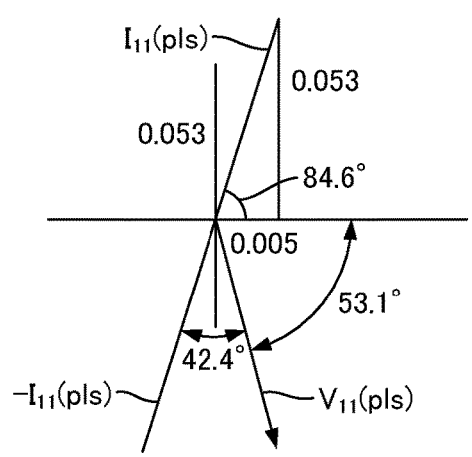
FIG. 23A is a vector diagram for illustrating the analysis result in FIG. 22 in a case where the 11th harmonic current of the triangular wave is used.
Figure 23B:
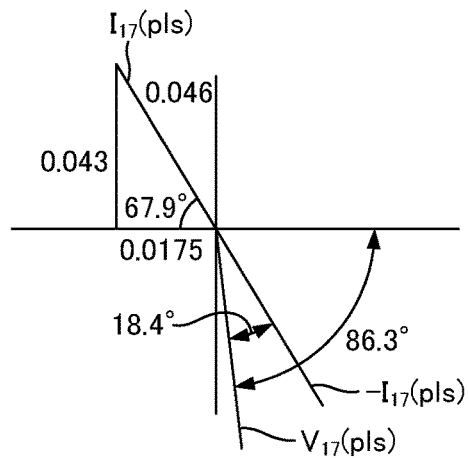
FIG. 23B is a vector diagram for illustrating the analysis result in FIG. 22 in a case where the 17th harmonic current of the triangular wave is used.
Figure 23C:
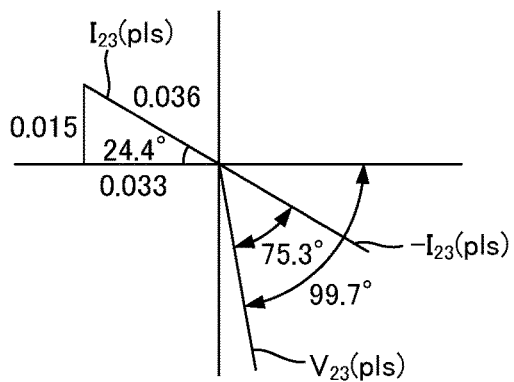
FIG. 23C is a vector diagram for illustrating the analysis result in FIG. 22 in a case where the 23rd harmonic current of the triangular wave is used.

FIG. 22 shows a case where the generation phase of the triangular wave is set to θpls=+10°, a width is set to Δθpls=16°, and an increment is set to 0.05°. A vector relation of the 11th harmonic is shown in FIG. 23A, a vector relation of the 17th harmonic in FIG. 23B, and a vector relation of the 23rd harmonic in FIG. 23C.

Herein, making a description on the 17th harmonic, the sin value is 0.043 and the cos value is 0.0175, and the spectrum value of I17(*pls*) is 0.046 as shown from the corresponding columns of Table 4. The 17th harmonic is advanced by 112.1° with respect to the power source voltage V1. A phase angle θZ(pall) of the impedance Z17(pall) is delayed by 18.4°, and thus the phase angle of the harmonic voltage V17(*pls*) comes to be delayed by 86.3°.

Table 4 collectively shows the Fourier analysis results illustrated in FIG. 22 with respect to the triangular waves having different phases and pulse widths. In Table 4, in a case where θpls=+10° and Δθpls (width)=16°, the phase angle of the harmonic voltage V17(*pls*) of the 17th harmonic is 86.3° and the phase angle of the 23rd harmonic is 99.7°, both of which are delayed by 90° and fall within the range of ±30°, but the phase angle of the 11th harmonic is 53.1°. The entire evaluation over the 11th, 17th, and 23rd harmonics is not determined as "Good".

As an effective combination that the entire evaluation on the 11th, 17th, and 23rd harmonics is determined as "Good" in Table 4, there are a width Δθpls of 5 to 6° in a case where the phase θpls is 8.0°, a width of 9° in a case where the phase θpls is 9°, a width Δθpls of 11° or more and up to 22° in a case where the phase θpls is 10°, a width Δθpls of 10.8° or more and up to 30° in a case where the phase θpls is 10.8°, and a width Δθpls of 25 to 28° in a case where the phase θpls is 12.6°.

In this way, with respect to the rotational magnetic flux φν(slot) of the ν-th (11th, 17th, and 23rd) harmonic which is caused by the slot and generates the backward rotation torque, the rotational magnetic flux φν(pls) of the harmonic having the opposite phase at the same degree as that of the rotational magnetic flux φν(slot) is generated based on the harmonic current Iν(pls) to reduce the rotational magnetic flux φν(slot) of the harmonic, so that the efficiency of the electric motor can be improved.

Figure 24:
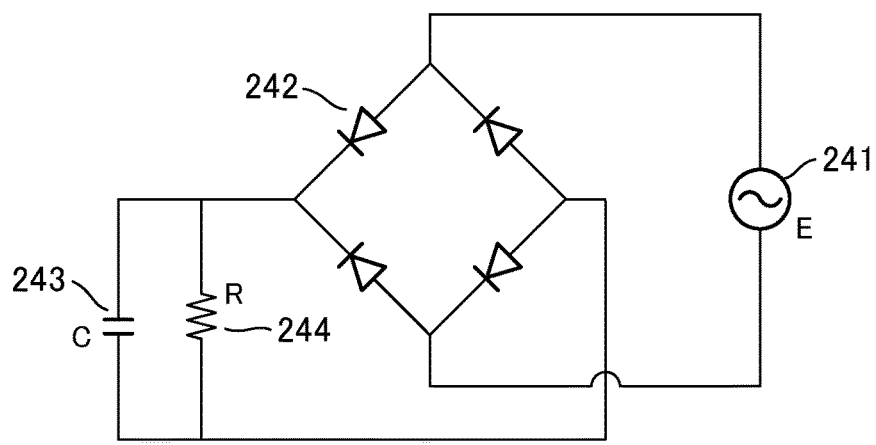
FIG. 24 is a circuit diagram illustrating an example of a harmonic current generator used in the apparatus of FIG. 13.

As one of schemes for obtaining such a pulse current at a phase before the peak of the power source voltage, a configuration illustrated in FIG. 24 is used. FIG. 24 is a scheme for obtaining a pseudo-rectangular pulse current using a CR rectifying circuit. In this scheme, a power source 241 having a power source voltage E is connected to the alternating current input side of a full-wave rectifying circuit 242, and a parallel circuit made of a capacitor 243 and a resistor 244 is connected to the output side. In other words, the circuit includes the capacitor 243 which is charged or discharged at each half wave of the power source voltage E and the discharge resistor 244 which is connected to the capacitor 243 in parallel. The circuit is configured to generate a pseudo-rectangular pulse current having a predetermined pulse width τ at a phase before the peak phase of the half wave due to a time constant CR determined by an electrostatic capacitance C of the capacitor 243 and a resistance value R of the discharge resistor 244. This relation will be described using FIG. 25.

The rectified power source voltage E is added to the capacitor 243 illustrated in FIG. 24, and the capacitor is charged up to a peak value Ep1 of the voltage E at a timing of t0. In the half period after t0, the electric charges charged in the capacitor 243 is discharged to the resistor 244 at the time constant CR, and a terminal voltage Cv of the capacitor is gradually lowered. Then, the terminal voltage is lowered down to Ep2 at a timing t1'. At this time, the power source voltage E is increasing, and the charging current flows into the capacitor 243 between t1' and t0', which generates the pulse currents Iv(pls) and −Iv(pls). When the above circuit is replaced as the harmonic current generator 16 of FIG. 13, the power source 241 corresponds to the power trunk line of the power source voltage V1, and the pulse current Iv(pls) before the peak of the power source voltage V1 is output as illustrated in FIGS. 16, and 17A to 17C.

Figure 25:
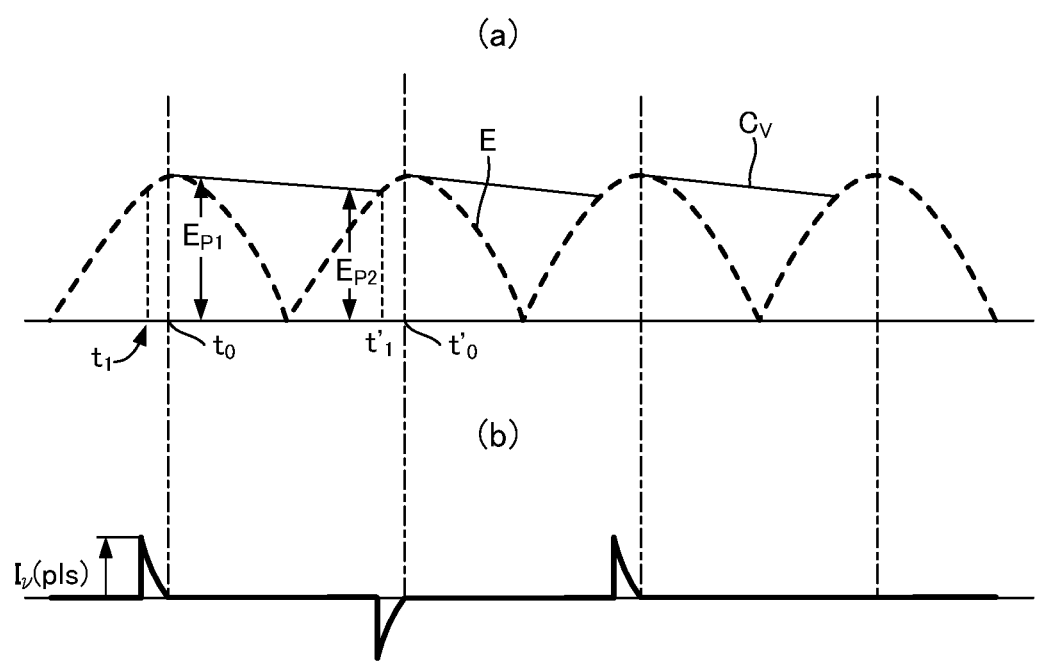
FIG. 25 is a waveform diagram illustrating a process of generating a pulse using the circuit illustrated in FIG. 24.

The waveform of this circuit has a short rising time and a relatively long falling time as illustrated in FIG. 25(*b*). As illustrated in FIGS. 17A to 17C, the rising timing is set to the generation phase θpls of the pulse, and a width up to a 33% lowered point of the peak current value A is set to the pulse width Δθpls. At 50 Hz, 0.2 A, θpls=10.8°, and Δθpls=7 to 8° are obtained on conditions of R=16.4 kΩ, C=27 μF, and time constant=440 ms. In addition, at 50 Hz, 0.15 A, θpls=10.8°, and Δθpls=7 to 8° are obtained on conditions of R=20 kΩ, C=22 μF, and time constant=440 ms.

Figure 26:
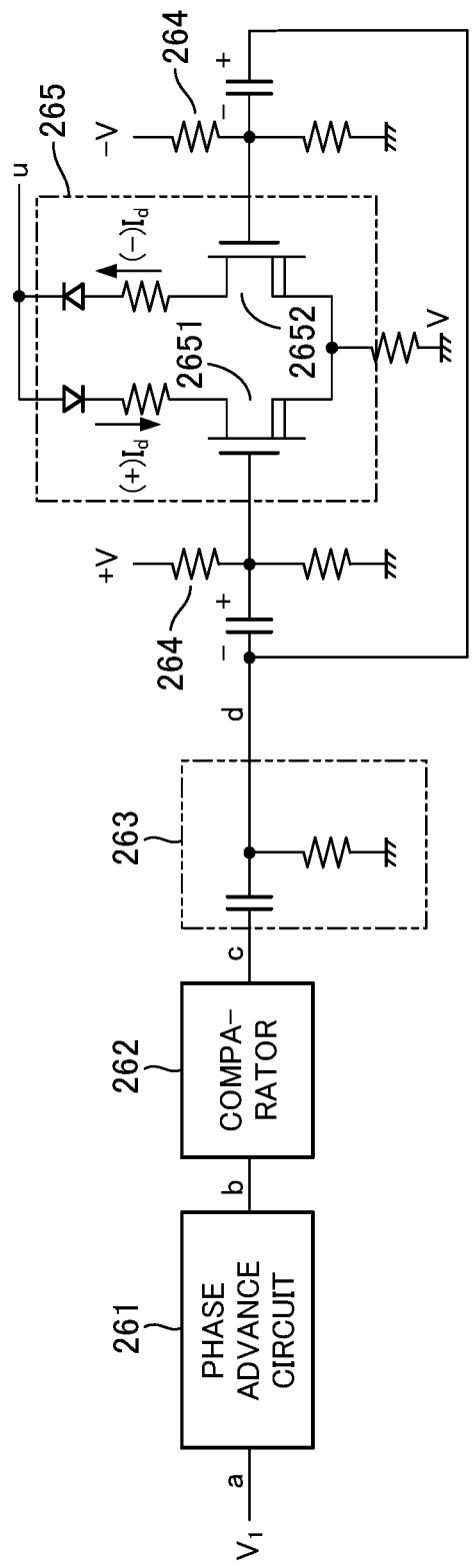
FIG. 26 is a circuit diagram illustrating another example of the harmonic current generator used in the apparatus of FIG. 13.
Figure 27:
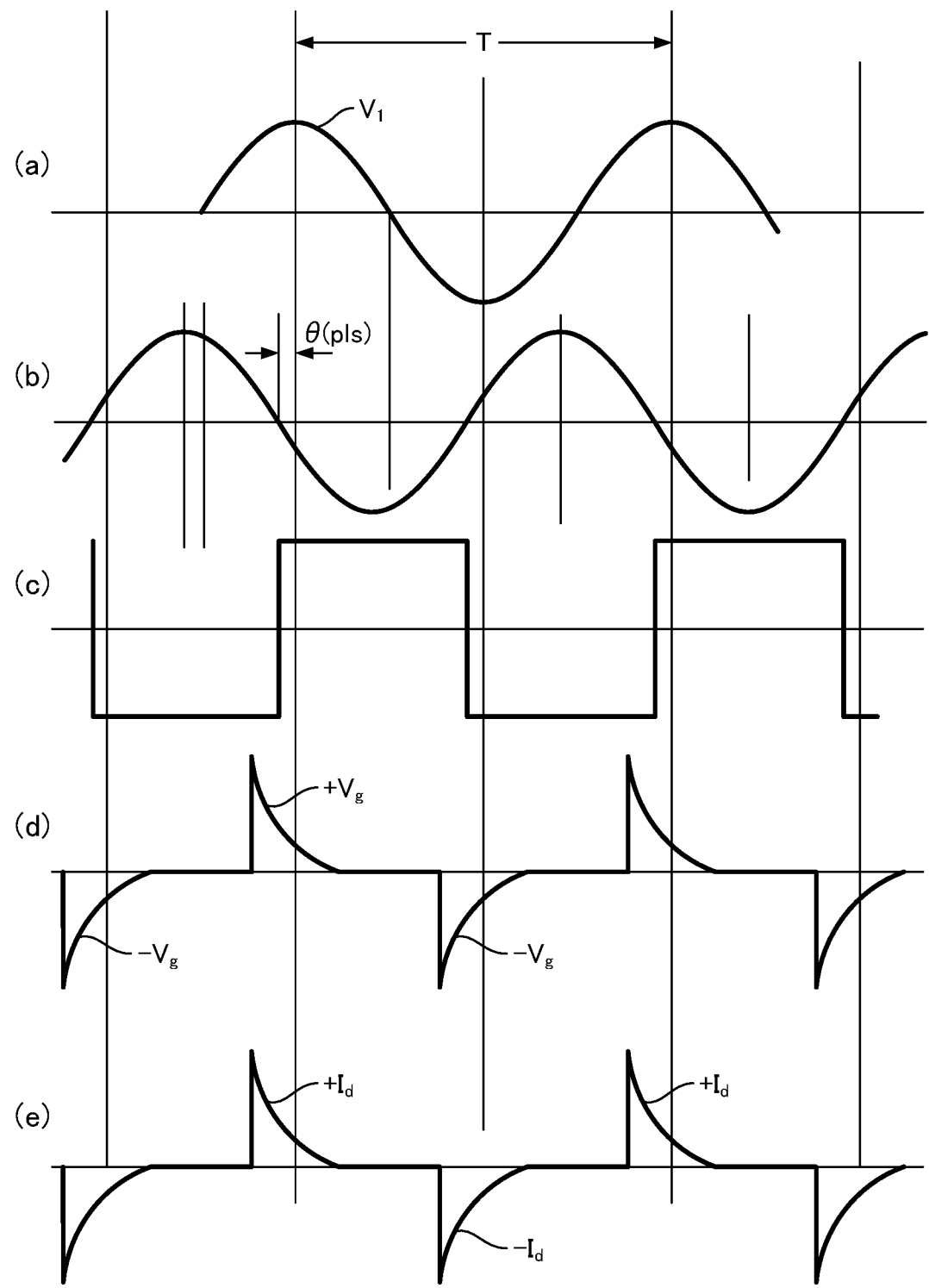
FIG. 27 is a waveform diagram alternately illustrating waveforms at respective points of the apparatus of FIG. 26.

Besides, an electronic circuit illustrated in FIG. 26 may be used as the circuit which outputs the pulse current Iv(pls) before the peak of the power source voltage V1. In this case, the harmonic current generator 16 is configured by, as illustrated in FIG. 26, a phase advance circuit 261, a comparator 262, a differentiation circuit 263, a bias circuit 264, and an output circuit 265. In addition, the timings of voltages and currents of the respective units are illustrated in FIG. 27.

The phase advance circuit 261 is configured by an integration circuit which uses an operational amplifier, which not illustrated in the drawing, and includes a parallel capacitor and a variable resistor for adjusting the phase. The input voltage from the respective phases (for example, the u phase), that is, the power source voltage V1 of the basic wave, is input to an input point "a" of the phase advance circuit 261 (the waveform "a" of FIG. 27). A sinusoidal wave voltage (the waveform "b" of FIG. 27) of which the phase is advanced by 90°−θpls with respect to the power source voltage V1 of the basic wave is output at an output point "b" of the phase advance circuit 261 by adjusting the above-described resistor. Further, the phase advance circuit 261 may be configured in a digital calculation system.

The sinusoidal wave is input to the comparator 262, and formed as a rectangular wave. Therefore, a rectangular wave (the waveform "c" of FIG. 27) of which the phase rises or falls at points advanced by 90°−θpls with respect to the origin point of the power source voltage V1 of the basic wave is obtained at an output terminal "c".

This rectangular wave is input to and differentiated by the differentiation circuit 263. The differentiation circuit 263 is configured by a capacitor and a variable resistor for adjusting a time constant as is well known. When the above-described rectangular wave is input, exponential waves +Vg and −Vg (the waveform "d" of FIG. 27) of the differentiation outputs are obtained at an output point "d".

The output circuit 265 provided between the line u and v forming one phase of the trunk line is connected to the output side of the differentiation circuit 263. The output circuit 265 includes power transistors or MOS FETs (the drawing illustrates the MOS FETs) 2651 and 2652 as final-stage output elements connected in reverse parallel between the lines u and v through diodes and resistors. Then, the bases or gates of these output elements are connected to the output side of the above-described differentiation circuit 263 through bias circuit 264. In this way, the bias circuit 264 are respectively provided in the bases or gates of the power transistors or MOS FETs 2651 and 2652 so as to function as an analog amplifier.

With the above configuration, the differentiation outputs +Vg and −Vg each are input to the output circuit 265, and applied to the bases or gates of the power transistors or MOS FETs 2651 and 2652 configured as a final-stage output element. Therefore, the output currents +Id and −Id (the waveform "e" of FIG. 27) flow to the final-stage output elements 2651 and 2652, and output as the pulse current Iv(pls).

Herein, the pulse current Iv(pls) can generate a pulse having a phase advanced by θpls with respect to the peak phase of the power source voltage V1 by adjusting a variable resistance value of the phase advance circuit 261. In addition, the pulse width Δθpls can be adjusted to be an arbitrary width by changing a variable resistance value of the differentiation circuit 263.

Table 5 shows measurement results of the changing input power obtained by comparing a case where the apparatus of the invention is introduced to a 75 kw load (a motor for a refrigerator), and the 17th continuous current I17(*pls*)=0.05 A is applied thereto with a case where the apparatus is not introduced. As a result, the power is lowered by about 11% as denoted in Table.

TABLE 5

|  | Not Introduced | | | Introduced | | |
|---|---|---|---|---|---|---|
|  | | | Time | | | |
| Pm (kw) | 9:00 | 10:00 | 11:00 | 12:00 | 13:00 | 14:00 |
| Motor Power (kw) | 76.2 | 74.5 | 75.2 | 67.5 | 67.2 | 67.8 |
| Motor Average Power (kw) | | 75.3 | | | 67.5 | |
| Lowering Rate (%) | | 0 | | | 11% Lowered | |

Table 6 shows the result obtained by measuring the input powers in a case where the 11th continuous current I11(*pls*)=0.05 A is applied to a load (a motor for a refrigerator). The power is lowered by about 5%. From this result, there is a possibility that (Z1/P) of the motor of the load is 18.

TABLE 6

|  | Not Introduced | | | Introduced | | |
|---|---|---|---|---|---|---|
|  | | | Time | | | |
| Pm (kw) | 9:00 | 10:00 | 11:00 | 12:00 | 13:00 | 14:00 |
| Motor Power (kw) | 76.6 | 75.3 | 75.5 | 71.2 | 72.3 | 72.0 |
| Motor Average Power (kw) | | 75.6 | | | 77.8 | |
| Lowering Rate (%) | | 0 | | | 5 % Lowered | |

Table 7 shows the results obtained by measuring the input powers in a case where the 23rd continuous current I23(pls)=0.05 A is applied to a load (a motor for a refrigerator). The power is lowered by about 4%.

TABLE 7

|  | Not Introduced | | | Introduced | | |
|---|---|---|---|---|---|---|
|  | Time | | | | | |
| Pm (kw) | 9:00 | 10:00 | 11:00 | 12:00 | 13:00 | 14:00 |
| Motor Power (kw) | 76.0 | 76.2 | 75.4 | 72.3 | 72.6 | 72.4 |
| Motor Average Power (kw) | | 75.5 | | | 72.4 | |
| Lowering Rate (%) | | 0 | | | 4% Lowered | |

Table 8 shows the results obtained by measuring the input powers in a case where the continuous current obtained by adding 0.05 A of each of the 11th, 17th, and 23rd harmonic currents is applied to a load (a motor for a refrigerator). The power is lowered by about 14%.

TABLE 8

|  | Time | | | | | |
|---|---|---|---|---|---|---|
|  | 9:00 | 10:00 | 11:00 | 12:00 | 13:00 | 14:00 |
|  | Not Introduced | | | Introduced | | |
| Motor Power (kw) | 76.3 | 75.2 | 74.5 | 65.3 | 64.2 | 65.5 |
| Motor Average Power (kw) | | 75.3 | | | 65.0 | |
| Lowering Rate (%) | | 0 | | | 14.0 | |

Table 9 shows the results obtained by measuring the input powers in a case where the 1.0 A rectangular pulse current which is symmetric with respect to the peak value of the power source voltage V1 and has a width $\Delta\theta pls=7.2°$ ($\tau=0.4$ ms at 50 Hz) is applied to a load (a motor for a refrigerator). The power is lowered by about 11.2%.

TABLE 9

|  | Time | | | | | |
|---|---|---|---|---|---|---|
|  | 9:00 | 10:00 | 11:00 | 12:00 | 13:00 | 14:00 |
|  | Not Introduced | | | Introduced | | |
| Motor Power (kw) | 76.0 | 74.7 | 75.5 | 66.8 | 67.3 | 67.5 |
| Motor Average Power (kw) | | 75.4 | | | 67.2 | |
| Lowering Rate (%) | | 0 | | | 11.2 | |

Table 10 shows the results obtained by measuring the input powers of a load (a 22 kw motor for a blower) measured in a case the parallel capacitor resonating to the 17th harmonic is connected and a flowing rectangular pulse current Iv(pls) which is advanced by $\theta pls=10°$ ($\tau=0.55$ ms at 50 Hz) with respect to a timing of the peak of the power source voltage V1 and has a width $\Delta\theta pls=7°$ ($\tau=0.4$ ms at 50 Hz) is 0.5 A. The power is lowered by about 12.6%.

TABLE 10

|  | Elapsed Time | | | | | |
|---|---|---|---|---|---|---|
|  | 9:00 | 10:00 | 11:00 | 12:00 | 13:00 | 14:00 |
|  | Not Introduced | | | Introduced | | |
| Input Power (kw) of Motor | 12.5 | 12.7 | 12.4 | 11.2 | 11.0 | 11.2 |
| Motor Average Power (kw) | | 12.5 | | | 11.1 | |
| Lowering Rate (%) | | 0 | | | 12.6 | |

Table 11 shows the results obtained by measuring the input powers of a load (a 22 kw motor for a blower) measured in a case where the parallel capacitor resonating to the 17th harmonic is connected and a flowing rectangular pulse current Iv(pls) which is advanced by $\theta pls=9°$ (0.5 ms) with respect to a timing of the peak of the power source voltage V1 and has a width of $\Delta\theta pls=5°$ (0.28 ms) is 0.5 A. The power is lowered by about 11.6%.

TABLE 11

|  | Elapsed Time | | | | | |
|---|---|---|---|---|---|---|
|  | 1 H | 2 H | 3 H | 4 H | 5 H | 6 H |
|  | Not Introduced | | | Introduced | | |
| Input Power (kw) of Motor | 12.4 | 12.7 | 12.5 | 11.3 | 10.9 | 11.3 |
| Motor Average Power (kw) | | 12.5 | | | 11.2 | |
| Lowering Rate (%) | | 0 | | | 11.6 | |

Table 12 shows the results obtained by measuring the input powers of a load (a 22 kw motor for a blower) measured in a case where the parallel capacitor resonating to the 17th harmonic is connected and a flowing rectangular pulse current Iv(pls) which is advanced by $\theta pls=8.1°$ (0.45 ms) with respect to a timing of the peak of the power source voltage V1 and has a width of $\Delta\theta pls=5.4°$ (0.3 ms) is 0.5 A. In this case, the effect (power lowering) is less as much as 3%. It is considered that the obtained result is caused because, as listed in Table 2, the 17th and 23rd harmonic voltages V17(pls) and V23(pls) have not the opposite phase to the harmonic voltage Vv(slot) caused by the slot.

TABLE 12

|  | Elapsed Time | | | | | |
|---|---|---|---|---|---|---|
|  | 1 H | 2 H | 3 H | 4 H | 5 H | 6 H |
|  | Not Introduced | | | Introduced | | |
| Input Power (kw) of Motor | 12.5 | 12.7 | 12.4 | 12.0 | 12.1 | 12.3 |
| Motor Average Power (kw) | | 17.5 | | | 12.1 | |
| Lowering Rate (%) | | 0 | | | 3.0 | |

Table 13 shows the results obtained by measuring the input powers of a load (a 22 kw motor for a blower) measured in a case where the parallel capacitor resonating to the 17th harmonic is connected and a flowing exponential pulse current Iv(pls) which is advanced by $\theta pls=7°$ (0.4 ms) and has a width of $\Delta\theta pls=6°$ (0.33 ms) is 0.5 A. Even in this case, the effect (power lowering) is less as much as 2.4%. It is considered that the obtained result is caused because, as listed in Table 3, the 17th and 23rd harmonic voltages V17(pls) and V23(pls) have not the opposite phase to the harmonic voltage Vv(slot) caused by the slot.

TABLE 13

| | Elapsed Time | | | | | |
|---|---|---|---|---|---|---|
| | 1 H | 2 H | 3 H | 4 H | 5 H | 6 H |
| | Not Introduced | | | Introduce | | |
| Input Power (kw) of Motor | 12.3 | 12.7 | 12.5 | 12.0 | 12.3 | 12.3 |
| Motor Average Power (kw) | | 12.5 | | | 12.2 | |
| Lowering Rate (%) | | 0 | | | 2.4 | |

Table 14 shows the results obtained by measuring the input powers of a load (a 22 kw motor for a blower) measured in a case where the parallel capacitor resonating to the 17th harmonic is connected and a flowing exponential pulse current Iv(pls) which is advanced by θpls=9° (0.5 ms) and has a width of Δθpls=5° (0.28 ms) is 0.5 A. The 12.5% effect (power lowering) is obtained.

TABLE 14

| | Elapsed Time | | | | | |
|---|---|---|---|---|---|---|
| | 1 H | 2 H | 3 H | 4 H | 5 H | 6 H |
| | Not Introduced | | | Introduced | | |
| Input Power (kw) of Motor | 12.4 | 12.6 | 12.5 | 11.1 | 10.9 | 11.3 |
| Motor Average Power (kw) | | 12.5 | | | 11.1 | |
| Lowering Rate (%) | | 0 | | | 12.5 | |

Table 15 shows the results obtained by measuring the input powers of a load (a 22 kw motor for a blower) measured in a case where the parallel capacitor resonating to the 17th harmonic is connected and a flowing exponential pulse current Iv(pls) which is advanced by θpls=10.8° (0.6 ms) and has a width of Δθpls=7° (0.4 ms) is 0.5 A. The 11.7% effect (power lowering) is obtained.

TABLE 15

| | Elapsed Time | | | | | |
|---|---|---|---|---|---|---|
| | 1 H | 2 H | 3 H | 4 H | 5 H | 6 H |
| | Not Introduced | | | Introduced | | |
| Input Power (kw) of Motor | 12.5 | 12.6 | 12.3 | 11.5 | 10.8 | 11.2 |
| Motor Average Power (kw) | | 12.5 | | | 11.2 | |
| Lowering Rate (%) | | 0 | | | 11.7 | |

Table 16 shows the results obtained by measuring the input powers of a load (a 22 kw motor for a blower) measured in a case where the CR circuit system (R=16 kΩ, C=27 μF, Time constant=440 ms, and Iv(pls)=0.15 A) and the parallel capacitor resonating to the 17th harmonic are mounted. As a result, the 12.6% effect (power lowering) is obtained. This result corresponds to that of the rectangular wave which is advanced by θpls=10.8° and has a width Δθpls=7.2° in Table 2.

TABLE 16

| | Elapsed Time | | | | | |
|---|---|---|---|---|---|---|
| | 1 H | 2 H | 3 H | 4 H | 5 H | 6 H |
| | Not Introduced | | | Introduced | | |
| Input Power (kw) of Motor | 12.3 | 12.7 | 12.4 | 11.0 | 11.4 | 10.9 |
| Motor Average Power (kw) | | 12.5 | | | 11.1 | |
| Lowering Rate (%) | | 0 | | | 17.6 | |

Table 17 shows the results obtained by measuring the input powers of a load (a 22 kw motor for a blower) measured in a case where the CR circuit system (R=22 kΩ, C=33 μF, Time constant=726 ms, and Iv(pls)=0.15 A) and the parallel capacitor resonating to the 17th harmonic are mounted. As a result, the 3.3% effect (power lowering) is obtained. This result corresponds to that of the rectangular wave which is advanced by θpls=7.2° and has a width Δθpls=5.4° in Table 2. It is considered that the obtained result is caused because the 17th and 23rd harmonic voltages V17(pls) and V23(pls) have not the opposite phase to the harmonic voltage Vv(slot) caused by the slot.

TABLE 17

| | Elapsed Time | | | | | |
|---|---|---|---|---|---|---|
| | 1 H | 2 H | 3 H | 4 H | 5 H | 6 H |
| | Not Introduced | | | Introduced | | |
| Input Power (kw) of Motor | 12.5 | 12.4 | 12.6 | 12.0 | 11.9 | 12.3 |
| Motor Average Power (kw) | | 12.5 | | | 12.1 | |
| Lowering Rate (%) | | 0 | | | 3.3 | |

Table 18 shows the results obtained by measuring the power consumption at every predetermined time when loads (one air conditioner, four fans, and the like, besides electric lamps) in an ordinary house are continuously operated from time 2:10 to 4:20. In this example, the power saving apparatus (the Saver) of the invention is turned on at a timing of 3:40 in the middle of the operation to cause the continuous current 0.03 A of the 17th harmonic having the same or opposite phase with respect to the power source voltage V1. In this example, the average power is lowered by about 7% by turning on the Saver.

TABLE 18

| | Time | Motor Power (kw) | Average Power (kw) | |
|---|---|---|---|---|
| Saver OFF | 2:10 | | 1.430 | (−)cos17ω1t |
| | 2:40 | 1.365 | | Application |
| | 3:00 | 1.455 | | |
| | 3:20 | 1.470 | | |
| Saver ON | 3:40 | 1.395 | 1.340 | (+)cos17ω1t |
| | 4:00 | 1.320 | | Application (7% |
| | 4:20 | 1.305 | | Lowered) |

Table 19 shows, similarly, the results obtained by measuring the power consumption at every predetermined time when loads in an ordinary house are continuously operated from time 2:10 to 4:20. In this example, the Saver is turned on at a timing of 3:30 in the middle of the operation to cause the continuous current 0.03 A of the 11th harmonic having the same or opposite phase with respect to the power source voltage V1. In this example, the average power is lowered by about 11% by turning on the Saver. From this result, it can be seen that the number of slots (Z1/P) per pole of an general motor is likely to be 12.

TABLE 19

| | Time | Motor Power (kw) | Average Power (kw) | |
|---|---|---|---|---|
| Saver OFF | 2:10 | | 2.241 | (−)cos11ω1t Application |
| | 2:30 | 2.175 | | |
| | 2:50 | 2.325 | | |
| | 3:10 | 2.220 | | |
| Saver ON | 3:30 | 2.250 | 2.010 | (+)cos11ω1t Application (11% Lowered) |
| | 3:50 | 19.20 | | |
| | 4:10 | 19.30 | | |
| | 4:20 | 19.40 | | |

Table 20 shows the comparison results of average values measured using "Integrating Wattmeter for Receiving High Voltage", "Integrating Wattmeter Dedicated to Refrigerating Machine", and "Integrating Wattmeter Dedicated to Auxiliary Machine" before and after an experiment of introducing the power saving equipment in Workplace A at a specific time (3:00 pm). From Table 20, it can be seen that the average value of each integrating wattmeter is lowered after the power saving equipment is introduced compared to the case before the introduction.

TABLE 20

| Integrating Wattmeter of TEPCO (Number of Instruments is 600) | | | | | Integrating Wattmeter Dedicated To NO1 Refrigerating Machine | | | | | Integrating Wattmeter Dedicated to Auxiliary Machine | | | | |
|---|---|---|---|---|---|---|---|---|---|---|---|---|---|---|
| Date | Read Value | Power per Hour (KW) | Average Power (KW) | Lowering Rate (%) | Date | Read Value | Power per Hour (KW) | Average Power (KW) | Lowering Rate (%) | Date | Read Value | Power per Hour (KW) | Average Power (KW) | Lowering Rate (%) |
| AM 10:00 | 7528.09 | | 132.00 | | AM 10:03 | 64571.5 | | 61.3 | | AM 10:24 | 55080.0 | | | |
| AM 11:00 | 7528.32 | 138.00 | | | AM 11:03 | 64578.5 | 70.0 | | | AM 11:24 | 55107.1 | 17.1 | 17.0 | |
| AM 12:00 | 7528.53 | 120.00 | | | AM 12:03 | 64684.0 | 55.0 | | | AM 12:24 | 56124.2 | 17.1 | | |
| PM 1:00 | 7628.78 | 132.00 | | | PM 1:03 | 64590.0 | 60.0 | | | PM 1:24 | 55141.1 | 16.9 | | |
| PM 2:00 | 7528.97 | 132.00 | | | PM 2:03 | 64590.0 | 60.0 | | | PM 2:24 | 55158.2 | 17.1 | | |
| PM 3:00 | 7629.15 | 108.00 | 112.80 | 14.60 | PM 3:03 | 64600.7 | 47.0 | 48.2 | 21.3 | PM 3:24 | 55175.0 | 16.8 | 16.8 | 3.6 |
| PM 4:00 | 7529.35 | 120.00 | | | PM 4:03 | 64605.0 | 43.0 | | | PM 4:24 | 55192.3 | 17.3 | | |
| PM 5:00 | 7529.53 | 108.00 | | | PM 5:03 | 64610.7 | 57.0 | | | PM 5:24 | 55207.1 | 14.8 | | |
| PM 6:00 | 7529.72 | 114.00 | | | PM 6:03 | 64615.0 | 43.0 | | | PM 6:24 | 55223.6 | 16.5 | | |
| PM 7:00 | 7529.91 | 114.00 | | | PM 7:03 | 64620.1 | 61.0 | | | PM 7:24 | | | | |

Table 21 shows the results of the similar experiment performed in Workplace B. From Table 21, it can be seen that the lowering rate of the average power before and after the power saving equipment is introduced at 15:15 is 14.3%.

TABLE 21

| Date | | Read Value (KWH) of Integrating Wattmeter of TEPCO | Watthour (KWH) per Hour: Instrument Multiplying Factor of Meter (600 times) (Difference of TEPCO Meter in 1 Hour) | Watthour (KWH) per Hour after Time Correction | Average Power | Lowering Effect (%) |
|---|---|---|---|---|---|---|
| April 12, 2012 | PM 13:17 | 6629.4 | | | | |
| April 12, 2012 | PM 14:10 | 6629.49 | 54.0 | 58.9 | Average | |
| April 12, 2012 | PM 15:10 | 6629.59 | 60.0 | 60 | 59.5 | |
| April 12, 2012 | PM 16:10 | 6629.68 | 54.0 | 54 | Average 51 | 14.3 |
| April 12, 2012 | PM 17:10 | 6629.76 | 48.0 | 48 | | |

Table 22 shows the comparison results of "Input Current", "Input Power", and "Temperature Change" of various types of motors in Workplace A before and after the power saving equipment is introduced (1.5 month). From the Table, it can be seen that the respective values in 1.5 month after the power saving equipment is introduced are lowered compared to those before the introduction.

TABLE 22

| | Change in Input Current | | Lowering Rate (%) of Input Current | Change in Input Power | | Lowering Rate (%) of Input Current | Change in Temperature of Motor Frame (° C.) | |
|---|---|---|---|---|---|---|---|---|
| | Before Introduction | In 1.5 Months After Introduction | | Before Introduction | In 1.5 Months After Introduction | | Before Introduction | In 1.5 Months After Introduction |
| Pipeline Circulation Pump (11 KW) | 41.5 A | 37.5 | 9.8 | 12.5 KW | 11.1 KW | 11 | 94 | 45 |

TABLE 22-continued

|  | Change in Input Current | | Lowering Rate (%) of Input Current | Change in Input Power | | Lowering Rate (%) of Input Current | Change in Temperature of Motor Frame (° C.) | |
|---|---|---|---|---|---|---|---|---|
|  | Before Introduction | In 1.5 Months After Introduction | | Before Introduction | In 1.5 Months After Introduction | | Before Introduction | In 1.5 Months After Introduction |
| Cooling Water Circulation Pump (3.7 KW) | 13.6 A | 12.4 | 9 | 4.4 KW | 3.9 KW | 11.3 | 61 | 50 |
| Cooling Tower Fan (2.3 KW) | 3.4 A | 7.5 A | 10.7 | 2.3 KW | 2.0 KW | 13 | | |
| Waste Water Pump (0.2 KW) | 0.6 A | 0.54 A | 10 | 0.16 KW | 0.1 KW | 12.5 | | |

Table 23 shows the values obtained by measuring average watthours of the integrating wattmeter for receiving high voltage from 2006 to July 2012 in Workplace C where a 75 KW large refrigerator is used. In the Table, the data from October 2011 to January 2012 shows demonstration results in a case where a power saving apparatus using a half-wave rectifying pulse generator is introduced, and the data thereafter shows the demonstration results in a case where a power saving apparatus using a full-wave rectifying pulse generator is introduced. From the Table, it can be seen that the data from October 2011 (when the power saving apparatus is introduced) shows the lowering in the power saving further more than the data of the same month so far. In particular, it can be seen that the power saving effect is remarkable after February 2012 when the power saving apparatus using the full-wave rectifying pulse generator is used.

TABLE 23

| Watthour | January | February | March | April | May | June | July | August | September | October | November | December |
|---|---|---|---|---|---|---|---|---|---|---|---|---|
| 2006 | 72,288 | 68,112 | 69,012 | 61,752 | 69,582 | 77,364 | 87,180 | 101,280 | 102,738 | 100,260 | 83,862 | 78,582 |
| 2007 | 68,604 | 61,326 | 62,928 | 59,160 | 71,664 | 72,258 | 82,266 | 89,388 | 103,338 | 99,690 | 84,234 | 80,244 |
| 2008 | 69,108 | 67,056 | 73,137 | 77,934 | 85,248 | 91,512 | 106,272 | 98,442 | 84,696 | 77,028 | 67,968 | 62,976 |
| 2009 | 65,652 | 60,678 | 68,826 | 71,862 | 82,278 | 85,788 | 97,944 | 90,324 | 82,158 | 77,196 | 71,010 | 67,830 |
| Watthour of 2010 | 66,318 | 59,802 | 66,402 | 70,200 | 82,596 | 98,946 | 111,516 | 110,400 | 86,700 | 77,754 | 72,048 | 65,658 |
| Average Watthour of 2008, 2009, 2010 | 67,026 | 62,512 | 69,455 | 73,332 | 83,374 | 92,082 | 105,244 | 99,722 | 84,518 | 77,326 | 70,342 | 65,488 |
| Watthour of 2011 | 68,904 | 60,030 | 62,184 | 63,516 | 76,242 | 97,182 | 102,072 | 97,050 | 75,924 | 69468 | 64698 | 58608 |
| Watthour of 2012 | 58,284 | 56,622 | 62,004 | 63,336 | 72,024 | 80,426 | 93,103 | | | | | |

While certain embodiments have been described, these embodiments have been presented by way of example only, and are not intended to limit the scope of the inventions. For example, the power source voltage is finely sampled in one period of a commercial frequency (basic frequency), and a timing of a maximum value of the power source voltage can be generated through a digital calculation. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such embodiments or modifications as would fall within the scope and spirit of the inventions.

REFERENCE SIGNS LIST

11: Transformer
12: Power trunk line
13: Harmonic generation unit
14: Electric motor
14-1: Stator
14-2: Rotor
15: Reactance circuit
16: Harmonic current generator
18: Capacitor for resonance
21: Slot

The invention claimed is:

1. Power equipment which includes an electric motor which is supplied with power from a power trunk line connected to a power source transformer, the power equipment comprising:
a harmonic generator which is provided in the power trunk line and which is configured to generate a harmonic voltage having a phase opposed to, but a same degree as, that of a harmonic voltage of a degree acting as a braking force on a rotor among harmonic voltages generated by a rotational magnetic flux of harmonics generated between a stator and the rotor based on a ratio (Z1/P) of a total number (Z1) of slots which contain a coil of the stator and a number (P) of electrode pairs, when the electric motor is operated,
wherein the harmonic generator includes
a harmonic current generator configured to generate a harmonic current having a same phase as that of a power source voltage supplied from the power trunk line and containing at least one harmonic current of an $11^{th}$, $17^{th}$ and $23^{rd}$ degree that corresponds to a degree $((Z1/P)-1)$ one less than the ratio $(Z1/P)$, and a reactance circuit which is provided in the power trunk line and includes an impedance containing a leakage reactance of the power source transformer, and generates a harmonic voltage which has the same $((Z1/P)-1)$ degree as that of the harmonic voltage acting as a braking force on the rotor and is delayed by $90\pm30$ degrees compared to the power source voltage, when the harmonic current flows.

2. The power equipment according to claim 1, wherein the harmonic current generator includes a comparator, a band pass filter, a phase circuit, a variable resistor, a synthesizer, and an output circuit with respect to at least one harmonic current of the $11^{th}$, $17^{th}$ and $23^{rd}$ degree.

3. The power equipment according to claim 2, wherein the output circuit includes a transformer at an output stage of the output circuit.

4. The power equipment according to claim 3, wherein the harmonic current generator generates a continuous harmonic current.

5. Power equipment which includes an electric motor which is supplied with power from a power trunk line connected to a power source transformer, the power equipment comprising:

a harmonic generator which is provided in the power trunk line and which is configured to generate a harmonic voltage having a phase opposed to, but a same degree as, that of a harmonic voltage of a degree acting as a braking force on a rotor among harmonic voltages generated by a rotational magnetic flux of harmonics generated between a stator and the rotor based on a ratio $(Z1/P)$ of a total number $(Z1)$ of slots which contain a coil of the stator and a number $(P)$ of electrode pairs, when the electric motor is operated, wherein the harmonic generator includes a harmonic current generator configured to generate a harmonic current having a same phase as that of a power source voltage supplied from the power trunk line and containing at least one harmonic current of an $11^{th}$, $17^{th}$ and $23^{rd}$ degree that corresponds to a degree $((Z1/P)-1)$ one less than the ratio $(Z1/P)$, and a reactance circuit which is provided in the power trunk line and which includes an impedance containing a leakage reactance of the power source transformer, and is configured to generate a harmonic voltage which has the same $((Z1/P)-1)$ degree as that of the harmonic voltage acting as the braking force on the rotor and is delayed by about 90 degrees compared to the power source voltage, when the harmonic current flows.

6. The power equipment according to claim 5, wherein the harmonic current generator includes a capacitor which is charged or discharged by positive or negative half wave of the power source voltage supplied from the power trunk line and a discharge resistor which is connected to the capacitor in parallel, sets a rising point of the output pulse to a phase advanced with respect to a peak point of the positive or negative half wave using an electrostatic capacitance of the capacitor and a resistance value of the discharge resistor, and determines a pulse width.

7. The power equipment according to claim 5, wherein the harmonic current generator includes a phase advance circuit configured to cause a phase of the power source voltage supplied from the power trunk line to be advanced, a comparator configured to generate a rectangular wave using a waveform of which the phase is advanced, and a differentiation circuit configured to differentiate the rectangular wave, and the harmonic current generator is configured to adjust a phase of a rising point of the output pulse using the phase advance circuit, and to adjust a width of the output pulse using the differentiation circuit.

8. The power equipment according to claim 5, wherein the harmonic current generator includes a phase advance circuit, a comparator, a differentiation circuit, a bias circuit, and an output circuit with respect to at least one harmonic current of the $11^{th}$, $17^{th}$ and $23^{rd}$ degree.

9. A harmonic suppression method in power equipment which includes an electric motor which is supplied with power from a power trunk line connected to a power source transformer, the method comprising:

by providing a harmonic generator in the power trunk line, suppressing a harmonic voltage acting as a braking force, the harmonic generator generating a harmonic voltage which has a phase opposed to, but a same degree as, that of the harmonic voltage of the degree acting as the braking force on a rotor among harmonic voltages generated by a rotational magnetic flux of harmonics generated between a stator and the rotor based on a ratio $(Z1/P)$ of a total number $(Z1)$ of slots which contain a coil of the stator and a number $(P)$ of electrode pairs, when the electric motor is operated, by a harmonic current generator, generating a harmonic current having a same phase as that of a power source voltage supplied from the power trunk line and containing at least one harmonic current of an $11^{th}$, $17^{th}$ and $23^{rd}$ degree that corresponds to a degree $((Z1/P)-1)$ one less than the ratio $(Z1/P)$, and by a reactance circuit which is provided in the power trunk line and includes an impedance which contains a leakage reactance of the power source transformer, generating a harmonic voltage which has the same $((Z1/P)-1)$ degree as that of the harmonic voltage acting as a braking force on the rotor and is delayed by $90\pm30$ degrees compared to the power source voltage, when the harmonic current flows.

10. The method according to claim 9, wherein the harmonic current generator includes a phase advance circuit, a comparator, a differentiation circuit, and an output circuit with respect to at least one harmonic current of the $11^{th}$, $17^{th}$ and $23^{rd}$ degrees.

11. The method according to claim 9, wherein the harmonic current generator generates a harmonic current of a pulse wave in which a center of a pulse width is matched with a peak point of the power source voltage.

* * * * *